United States Patent
Nagatani et al.

(12) 
(10) Patent No.: US 10,518,799 B2
(45) Date of Patent: Dec. 31, 2019

(54) STEERING SYSTEM

(71) Applicant: JTEKT CORPORATION, Osaka-shi, Osaka (JP)

(72) Inventors: Atsumune Nagatani, Kashihara (JP); Shigeru Morita, Kashihara (JP); Yu Myohoji, Habikino (JP); Masayoshi Sakuda, Kashihara (JP); Michiaki Yamaoka, Ikoma-gun (JP); Yoshihito Yoshihara, Kashihara (JP); Satoki Yoshimura, Shiki-gun (JP)

(73) Assignee: JTEKT CORPORATION, Osaka (JP)

( * ) Notice: Subject to any disclaimer, the term of this patent is extended or adjusted under 35 U.S.C. 154(b) by 103 days.

(21) Appl. No.: 15/881,943

(22) Filed: Jan. 29, 2018

(65) Prior Publication Data

US 2018/0222520 A1     Aug. 9, 2018

(30) Foreign Application Priority Data

Feb. 7, 2017     (JP) .................................. 2017-020730

(51) Int. Cl.
*B62D 1/19* (2006.01)
*B62D 1/184* (2006.01)
(Continued)

(52) U.S. Cl.
CPC .............. *B62D 1/195* (2013.01); *B62D 1/184* (2013.01); *B62D 1/185* (2013.01); *B62D 1/189* (2013.01)

(58) Field of Classification Search
CPC ......... B62D 1/184; B62D 1/185; B62D 1/195
See application file for complete search history.

(56) References Cited

U.S. PATENT DOCUMENTS

| 7,780,196 B2 * | 8/2010 | Cymbal | B62D 1/195 188/374 |
|---|---|---|---|
| 9,283,984 B2 * | 3/2016 | Matsuno | B62D 1/187 |

(Continued)

FOREIGN PATENT DOCUMENTS

| EP | 1 288 103 A2 | 3/2003 |
|---|---|---|
| EP | 1 908 663 A2 | 4/2008 |

(Continued)

OTHER PUBLICATIONS

Jul. 18, 2018 extended European Search Report issued in European Patent Application No. 18155059.1.

*Primary Examiner* — Faye M Fleming
(74) *Attorney, Agent, or Firm* — Oliff PLC

(57) ABSTRACT

There is provided a steering system that can absorb an increased total amount of shock at a time of a secondary collision. A steering member is connected to one end of an upper jacket in a column axial direction. A lower jacket is externally fitted with the other end of the upper jacket in the column axial direction so as to be slidable with respect to the upper jacket. The lower jacket is supported by a support member fixed to a vehicle body. At the time of a secondary collision, a first sliding member generates a first resistive force by performing first relative sliding with respect to the upper jacket, and a second sliding member which is moved together with the first sliding member in the column axial direction generates a second resistive force by performing second relative sliding with respect to the support member and the lower jacket.

11 Claims, 17 Drawing Sheets

(51) Int. Cl.
*B62D 1/185* (2006.01)
*B62D 1/189* (2006.01)

(56) References Cited

U.S. PATENT DOCUMENTS

| | | | |
|---|---|---|---|
| 10,093,341 B2 * | 10/2018 | Johta | B62D 1/189 |
| 2006/0163861 A1 | 7/2006 | Higashino | |
| 2008/0141817 A1 | 6/2008 | Fuchigami et al. | |
| 2014/0150595 A1 * | 6/2014 | Riefe | B62D 1/195 |
| | | | 74/492 |

FOREIGN PATENT DOCUMENTS

| | | |
|---|---|---|
| EP | 2910450 A1 | 8/2015 |
| JP | 2004-017908 A | 1/2004 |

* cited by examiner

STEERING SYSTEM

INCORPORATION BY REFERENCE

The disclosure of Japanese Patent Application No. 2017-020730 filed on Feb. 7, 2017 including the specification, drawings and abstract, is incorporated herein by reference in its entirety.

BACKGROUND OF THE INVENTION

1. Field of the Invention

The present invention relates to a steering system.

2. Description of the Related Art

There is known a steering system that has a double cylinder structure in which an inner column is internally fitted with an outer column and that is configured such that the two columns can be subjected to telescopic adjustment, that is, the two columns are relatively movable with respect to each other so that the double cylinders are expandable and contractible. In such a steering system, the position of the inner column with respect to the outer column in the axial direction is fixed by the telescopic adjustment. At a time of a secondary collision that occurs when a vehicle collides, a shock load is applied to the inner column, and the shock load is absorbed by a resistive force of frictional sliding of the inner column with respect to the outer column.

Japanese Patent Application Publication No. 2004-17908 (JP 2004-17908 A) describes a steering system in which a metallic ring is press-fitted with the outer peripheral surface of an inner column. At the time of a secondary collision, the inner column is frictionally moved with respect to an outer column, and thereafter the metallic ring collides against the outer column. After that, a shock load is absorbed by a load corresponding to the sum of a resistive force of frictional sliding of the inner column with respect to the outer column and a resistive force of frictional sliding of the inner column with respect to the metallic ring.

In the steering system described in JP 2004-17908 A, the metallic ring is press-fitted with the inner column so as to regulate one end of the telescopic adjustment range of the inner column. Therefore, a clearance is occasionally caused between the outer column and the metallic ring after the telescopic adjustment. At the time of a secondary collision, the inner column is moved with respect to the outer column, and thereafter the metallic ring frictionally slides over a certain clearance to collide against the outer column. Thus, at the time of a secondary collision, a shock load is absorbed by a resistive force of frictional sliding of the inner column with respect to the outer column and a resistive force of frictional sliding of the inner column with respect to the metallic ring. However, the resistive force of the frictional sliding of the inner column with respect to the outer column is fluctuated in accordance with the position of the inner column after the telescopic adjustment, and therefore the shock absorption at the time of a secondary collision highly depends on the resistive force of the frictional sliding of the inner column with respect to the metallic ring. This may result in an insufficient total amount of shock to be absorbed at the time of a secondary collision, depending on the position of the inner column after the telescopic adjustment.

In recent years, meanwhile, there has been requested a steering system in which a shock load can be controlled stepwise in accordance with the amount of movement of an inner column with respect to an outer column during a secondary collision, from the viewpoint of reducing a shock to be transferred to a driver at the time of a secondary collision. JP 2004-17908 A describes increasing the resistive force stepwise during movement of the inner column with respect to the metallic ring by increasing the diameter of the inner column stepwise. However, it is more desirable to set the shock load more appropriately.

SUMMARY OF THE INVENTION

It is an object of the present invention to provide a steering system that can absorb an increased total amount of shock at a time of a secondary collision and that allows setting an appropriate shock load.

An aspect of the present invention provides a steering system including: an upper jacket, to one end of which in a column axial direction a steering member is connected; a lower jacket externally fitted with the other end of the upper jacket in the column axial direction so as to be slidable with respect to the upper jacket; a support member fixed to a vehicle body to support the lower jacket; a first resistive force generation unit that generates a first resistive force by performing first relative sliding with respect to the upper jacket when the upper jacket is moved with respect to the lower jacket at the time of a secondary collision; and a second resistive force generation unit that is moved together with the first resistive force generation unit in the column axial direction, and that generates a second resistive force by performing second relative sliding with respect to at least one of the support member and the lower jacket when the upper jacket is moved with respect to the lower jacket at the time of a secondary collision.

With the aspect described above, when a secondary collision occurs, a shock is transferred to the upper jacket via the steering member. The lower jacket is supported by the support member which is fixed to the vehicle body. Therefore, at the time of a secondary collision, the upper jacket is moved with respect to the support member and the lower jacket. At the time of a secondary collision, the first resistive force generation unit generates a resistive force by performing the first relative sliding with respect to the upper jacket, and the second resistive force generation unit which is moved together with the first resistive force generation unit in the column axial direction generates a resistive force by performing the second relative sliding with respect to at least one of the support member and the lower jacket. That is, the first resistive force generation unit and the second resistive force generation unit, which are moved together with each other, are frictionally slidable with respect to the upper jacket and the support member (lower jacket), respectively, which are moved relative to each other at the time of a secondary collision. Therefore, at the time of a secondary collision, the first relative sliding or the second relative sliding is caused at the same time as movement of the upper jacket with respect to the lower jacket is started. Thus, the shock load at the time of a secondary collision starts being absorbed sufficiently by a resistive force of frictional sliding of the upper jacket with respect to the lower jacket and the first resistive force or the second resistive force immediately after the occurrence of the secondary collision. Hence, an increased total amount of shock at the time of a secondary collision can be absorbed.

In addition, the shock load can be controlled easily in accordance with the axial displacement of the upper jacket with respect to the lower jacket by adjusting the first resistive force and the second resistive force to respective desired values. For example, the shock load can be varied stepwise in accordance with the axial displacement of the upper jacket with respect to the lower jacket just by adjusting the first resistive force and the second resistive force to constant values that are different from each other. As a result, an increased total amount of shock at the time of a secondary collision can be absorbed, and the shock load can be set appropriately.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
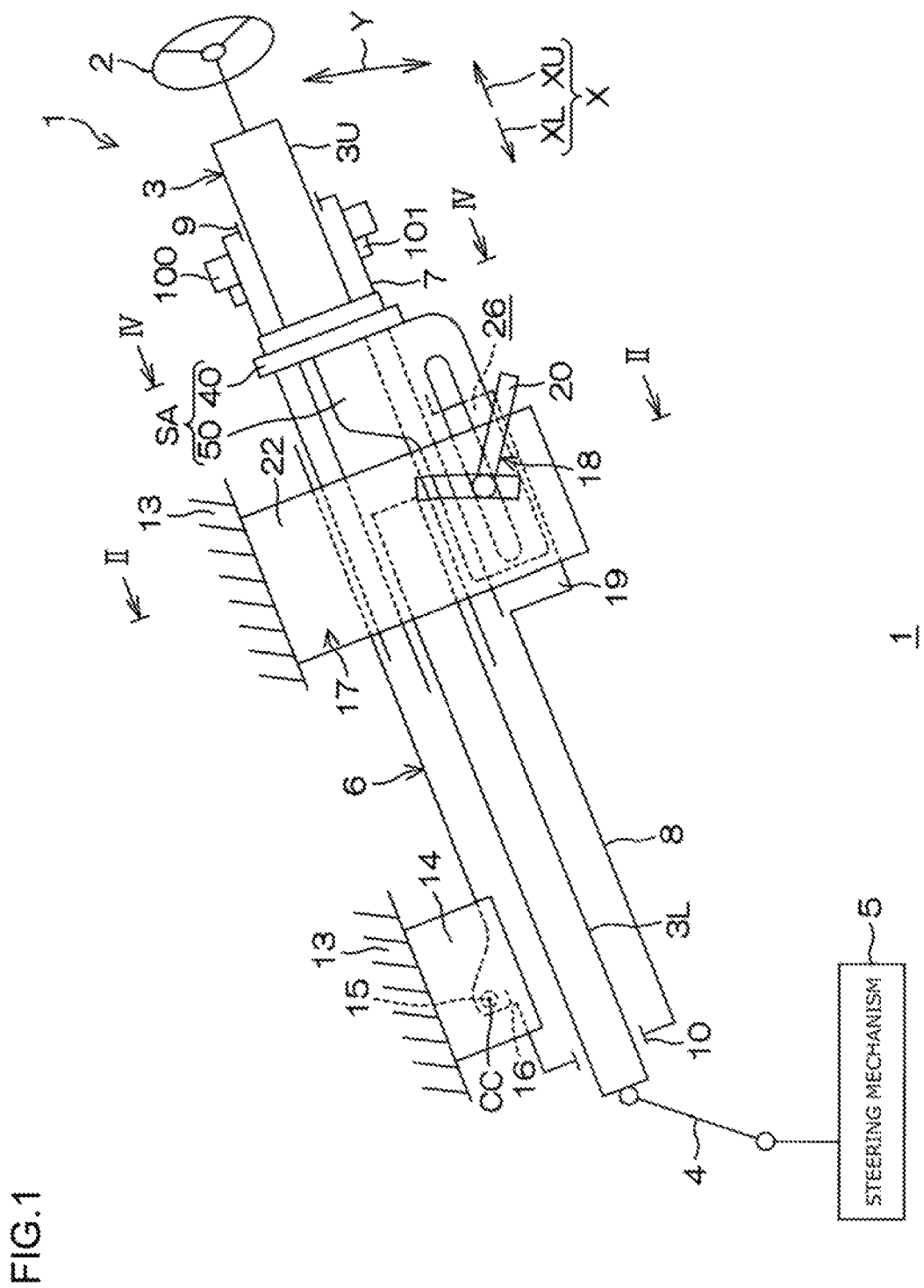
FIG. 1 is a schematic view illustrating a schematic configuration of a steering system according to a first embodiment of the present invention.

An embodiment of the present invention will be described in detail below with reference to the accompanying drawings. FIG. 1 is a schematic view illustrating a schematic configuration of a steering system 1 according to a first embodiment of the present invention. The steering system 1 of FIG. 1 includes a steering shaft 3, a column jacket 6, an intermediate shaft 4, and a steering mechanism 5. A steering member 2 such as a steering wheel is coupled to one end (an upper end in the axial direction) of the steering shaft 3. The steering system 1 steers steered wheels (not illustrated) in conjunction with a steering operation of the steering member 2. The steering mechanism 5 is a rack-and-pinion mechanism, for example, but is not limited thereto.

In the following, the upper side in a column axial direction X, which is the axial direction of the steering shaft 3, is referred to as an axially upper side XU, and the lower side in the column axial direction X is referred to as an axially lower side XL. The steering shaft 3 has a tubular upper shaft 3U and a lower shaft 3L. The upper shaft 3U and the lower shaft 3L are fitted so as to be movable relative to each other through spline fitting or serration fitting, for example. The steering member 2 is coupled to one end of the upper shaft 3U on the axially upper side XU.

The column jacket 6 includes an upper jacket 7, to one end of which the steering member 2 is connected via the upper shaft 3U, and a lower jacket 8 externally fitted with the other end of the upper jacket 7 so as to be slidable with respect to the upper jacket 7. The upper jacket 7 also serves as an inner jacket. The lower jacket 8 also serves as an outer jacket. The column axial direction X also serves as the axial direction of the upper jacket 7, and also serves as the axial direction of the lower jacket 8. The axially upper side XU also serves as the side of one end of the upper jacket 7. The axially lower side XL also serves as the side of the other end of the upper jacket 7.

The steering shaft 3 is inserted through the inside of the column jacket 6. The upper shaft 3U is rotatably supported by the upper jacket 7 via a bearing 9. The lower shaft 3L is rotatably supported by the lower jacket 8 via a bearing 10. When the upper shaft 3U is moved in the column axial direction X with respect to the lower shaft 3L, the upper jacket 7 is moved in the column axial direction X with respect to the lower jacket 8. The column jacket 6 is expandable and contractible in the column axial direction X together with the steering shaft 3.

The position of the steering member 2 can be adjusted in the front-rear direction of the vehicle by expanding and contracting the steering shaft 3 and the column jacket 6 in the column axial direction X. In this way, the steering system 1 has a telescopic adjustment function. Telescopic adjustment is performed by sliding the upper jacket 7 within a predetermined telescopic adjustment range. The telescopic adjustment range is a range between the upper-limit adjustment position of the upper jacket 7 in the column axial direction X and the lower-limit adjustment position of the upper jacket 7 in the column axial direction X. The column jacket 6 is expanded most when the upper jacket 7 is located at the upper-limit adjustment position, and contracted most when the upper jacket 7 is located at the lower-limit adjustment position.

Figure 2:
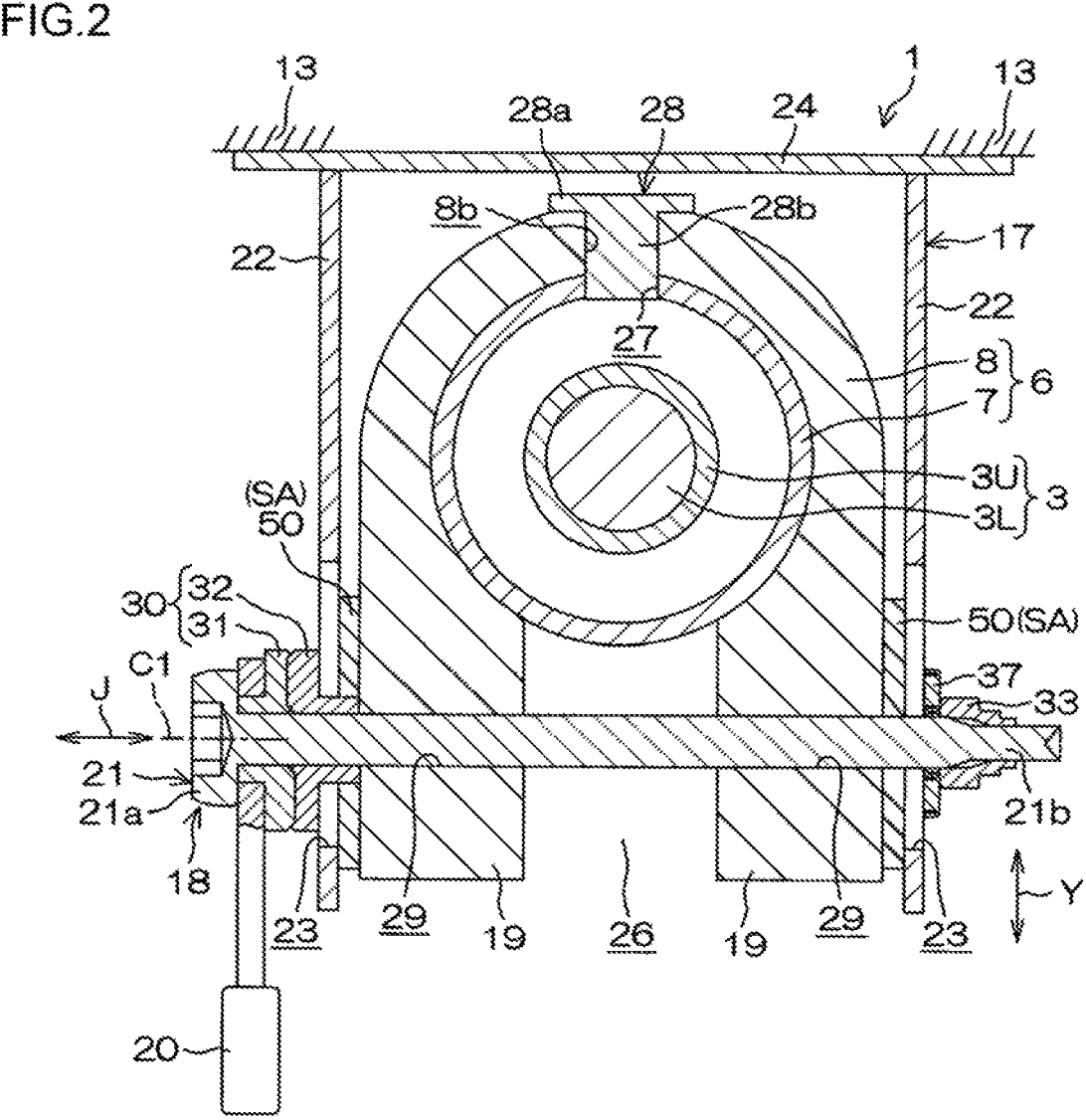
FIG. 2 is a schematic view illustrating a cross-sectional surface taken along the line II-II in FIG. 1.

FIG. 2 is a schematic view illustrating a cross-sectional surface taken along the line II-II in FIG. 1. The upper jacket 7 is formed with a guide groove 27 that is longitudinal in the column axial direction X. A guided protrusion 28 is fixed to the lower jacket 8. The guided protrusion 28 is fitted with the guide groove 27, and is movable relative to the guide groove 27 in the column axial direction X. The lower jacket 8 is formed with an insertion hole 8b through which the guided protrusion 28 is inserted. The guided protrusion 28 includes a head portion 28a that abuts against a portion of the outer peripheral surface of the lower jacket 8 that surrounds the insertion hole 8b, and a shaft portion 28b inserted through the insertion hole 8b. The head portion 28a and the shaft portion 28b are formed integrally with each other. The distal end of the shaft portion 28b is fitted with the guide groove 27.

During telescopic adjustment, the upper jacket 7 is regulated to the upper-limit adjustment position of the telescopic adjustment range with the lower end, in the axial direction, of the guide groove 27 abutting against the guided protrusion 28. Consequently, the upper jacket 7 is prevented from slipping out of the lower jacket 8. During telescopic adjustment, in addition, the upper jacket 7 is regulated to the lower-limit adjustment position of the telescopic adjustment range with the upper end, in the axial direction, of the guide groove 27 abutting against the guided protrusion 28.

With reference to FIG. 1, the steering system 1 includes a fixed bracket 14 fixed to a vehicle body 13, a tilt center shaft 15 supported by the fixed bracket 14, and a column bracket 16 fixed to the outer periphery of the lower jacket 8 and rotatably supported by the tilt center shaft 15. The steering shaft 3 and the column jacket 6 are turnable in a tilt direction Y (generally up-down direction) about a tilt center CC which is the center axis of the tilt center shaft 15.

The position of the steering member 2 can be adjusted in the tilt direction Y by turning the steering shaft 3 and the column jacket 6 about the tilt center CC. In this way, the steering system 1 has a tilt adjustment function. With reference to FIG. 2, the steering system 1 includes a support member 17 such as a bracket fixed to the vehicle body 13 to support the lower jacket 8, and a tightening mechanism 18 that locks the position of the upper jacket 7 after tilt adjustment and telescopic adjustment. The tightening mechanism 18 tightens a pair of tightened portions 19, which are provided integrally with the upper portion of the lower jacket 8 in the column axial direction X, via the support member 17.

The lower jacket 8 has a slit 26 that extends toward the axially lower side XL from an axially upper end 8a of the lower jacket 8. Each tightened portion 19 of the pair of tightened portions 19 is disposed on both sides of the slit 26. The tightening mechanism 18 is attached to the tightened portions 19. When the tightening mechanism 18 tightens the tightened portions 19, the lower jacket 8 tightens the upper jacket 7 with the diameter of the lower jacket 8 elastically reduced.

The support member 17 includes an attachment plate 24 attached to the vehicle body 13, and a pair of side plates 22 that extend downward in the tilt direction Y from both ends of the attachment plate 24. The side plates 22 are each formed with a tilt long hole 23 that extends in the tilt direction Y. The pair of tightened portions 19 of the lower jacket 8 are disposed between the pair of side plates 22, and each tightened portion 19 has a shape of a plate that extends along an inner side surface 22a of the corresponding side plate 22. The tightened portions 19 are each formed with a shaft insertion hole 29 which is a circular hole.

The tightening mechanism 18 includes a tightening shaft 21 (insertion shaft) and an operation lever 20 that is operable to rotate the tightening shaft 21. A center axis C1 of the tightening shaft 21 corresponds to the center of rotation of the operation lever 20. The tightening shaft 21 is a bolt, for example. The tightening shaft 21 is inserted through the tilt long holes 23 of the two side plates 22 of the support member 17 and the shaft insertion holes 29 of the two tightened portions 19 of the lower jacket 8. The tightening shaft 21 and the lower jacket 8 are moved relative to the support member 17 during tilt adjustment. In that event, the tightening shaft 21 is moved in the tilt direction Y in the tilt long holes 23.

A head portion 21a provided at one end of the tightening shaft 21 is fixed so as to be rotatable together with the operation lever 20. The tightening mechanism 18 further includes a force conversion mechanism 30 interposed between the head portion 21a of the tightening shaft 21 and a first side plate 22 (the side plate 22 on the left side in FIG. 2) to convert operating torque of the operation lever 20 into an axial force of the tightening shaft 21 (a tightening force for tightening the side plates 22). The force conversion mechanism 30 includes a rotary cam 31 and a first tightening member 32. The rotary cam 31 is coupled so as to be rotatable together with the operation lever 20. Movement of the rotary cam 31 with respect to the tightening shaft 21 in a tightening shaft direction J, in which the center axis C1 extends, is regulated. The first tightening member 32 is cam-engaged with the rotary cam 31 to tighten the first side plate 22. The tightening member 32 is a non-rotary cam, rotation of which is regulated. The first tightening member 32 faces a first tightened portion 19 (the tightened portion 19 on the left side in FIG. 2) of the lower jacket 8 in the tightening shaft direction J.

The tightening mechanism 18 further includes a second tightening member 33 that tightens a second side plate 22 (the side plate 22 on the right side in FIG. 2), and a needle roller bearing 37 interposed between the second tightening member 33 and the second side plate 22. The second tightening member 33 is a nut screwed to a threaded portion 21b provided at the other end of the tightening shaft 21. The second tightening member 33 tightens the second side plate 22 via the needle roller bearing 37. The second tightening member 33 faces a second tightened portion 19 (the tightened portion 19 on the right side in FIG. 2) of the lower jacket 8 in the tightening shaft direction J.

The rotary cam 31, the first tightening member 32, and the needle roller bearing 37 are supported by the outer periphery of the tightening shaft 21. Rotation of the tightening member 32 is regulated with the tightening member 32 fitted with the tilt long hole 23 which is formed in the first side plate 22. When the rotary cam 31 is rotated with respect to the tightening member 32 along with rotation of the operation lever 20 in the locking direction, the tightening member 32 is moved in the direction away from the rotary cam 31 along the tightening shaft direction J. Consequently, the pair of side plates 22 of the support member 17 are clamped by the pair of tightening members 32 and 33 to be tightened.

At this time, the side plates 22 of the support member 17 tighten the corresponding tightened portions 19 of the lower jacket 8, and thus movement of the lower jacket 8 in the tilt direction Y is regulated, achieving tilt lock. With the two tightened portions 19 tightened, in addition, the lower jacket 8 tightens the upper jacket 7 with the diameter of the lower jacket 8 elastically reduced. As a result, the upper jacket 7 is locked (held) at a predetermined telescopic position within the telescopic adjustment range, achieving telescopic lock.

In the manner described above, the tightening mechanism 18 tightens the lower jacket 8 to the upper jacket 7 via the support member 17 to hold the position of the upper jacket 7 with respect to the lower jacket 8. When the operation lever 20 is rotated in the unlocking direction, on the other hand, the tightening member 32 is moved in the direction closer to the rotary cam 31 along the tightening shaft direction J along with rotation of the rotary cam 31. Consequently, tightening of the pair of side plates 22 by the pair of tightening members 32 and 33 is released, enabling tilt adjustment and telescopic adjustment.

Figure 3:
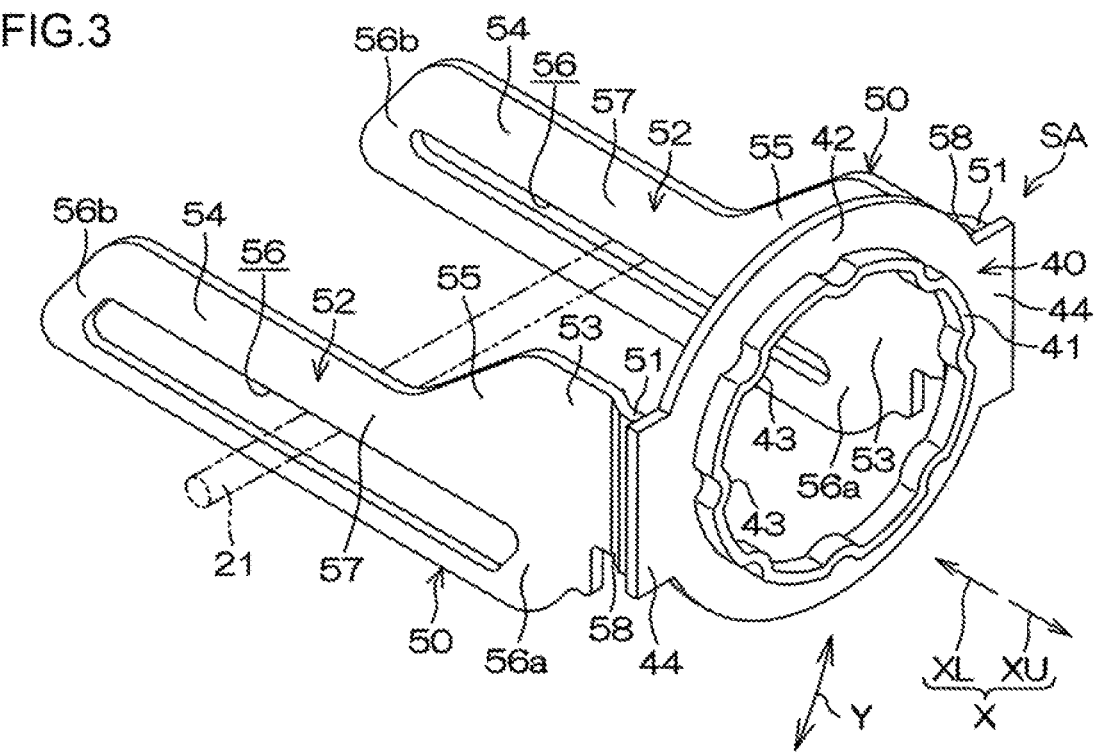
FIG. 3 is a perspective view of a shock absorption mechanism of the steering system.
Figure 4:
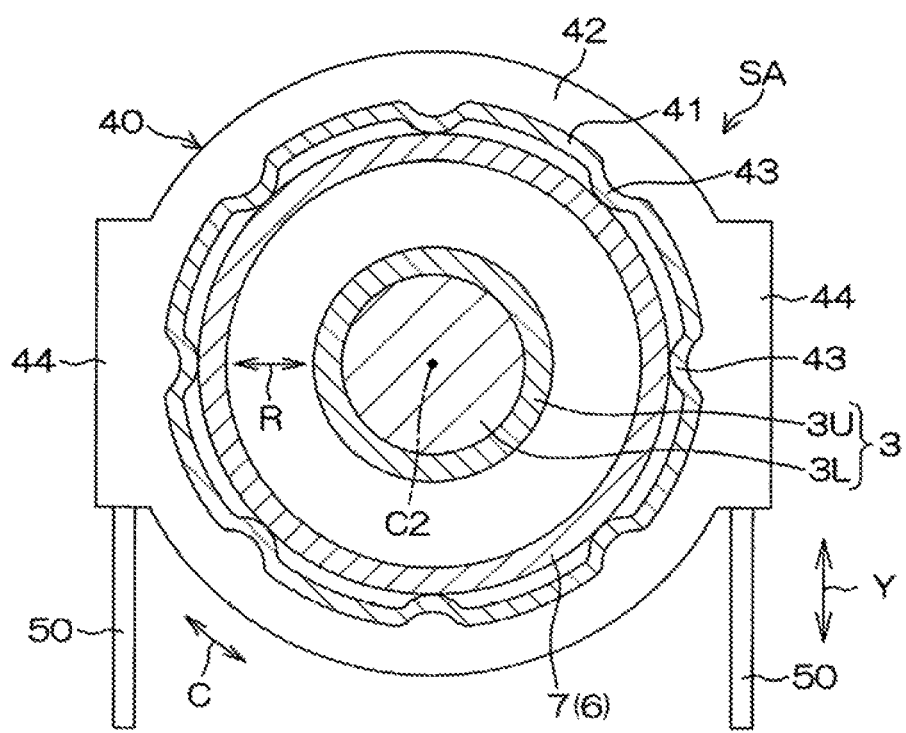
FIG. 4 is a schematic view illustrating a cross-sectional surface taken along the line IV-IV in FIG. 1.
Figure 5:
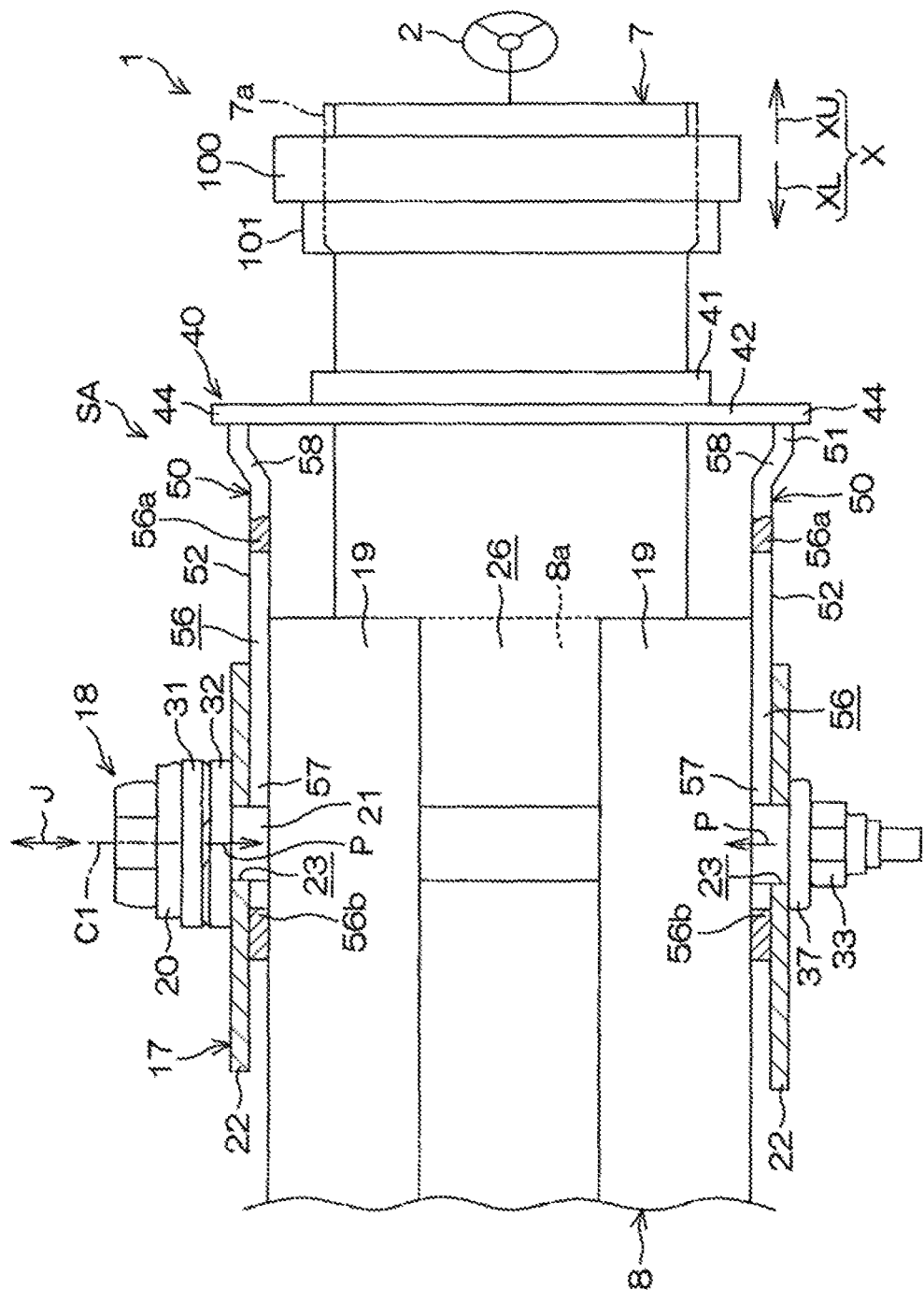
FIG. 5 is a schematic bottom view of the shock absorption mechanism and surrounding components.

With reference to FIG. 3, the steering system 1 further includes a shock absorption mechanism SA that absorbs a shock at a time of a secondary collision. The shock absorption mechanism SA includes a first sliding member 40 and a pair of second sliding members 50. The first sliding member 40 and the second sliding members 50 are made of metal, and formed integrally with each other by forging or the like. FIG. 4 is a schematic view illustrating a cross-sectional surface taken along the line IV-IV in FIG. 1. FIG. 5 is a schematic bottom view of the shock absorption mechanism SA and surrounding components.

With reference to FIG. 4, the first sliding member 40 is attached to the upper jacket 7 so as to be frictionally slidable with respect to the upper jacket 7. The first sliding member 40 is press-fitted with the upper jacket 7, for example. Frictional sliding between the first sliding member 40 and the upper jacket 7 is referred to as first relative sliding. A resistive force generated during the first relative sliding is referred to as a first resistive force G1. The first sliding member 40 includes a tubular fitted portion 41 externally fitted with the outer peripheral surface of the upper jacket 7, a flange portion 42 in a circular ring shape that extends outside in the radial direction of the upper jacket 7 from one end of the fitted portion 41, and a plurality of (eight in the present embodiment) projections 43 that project from the inner peripheral surface of the fitted portion 41 toward the outer peripheral surface of the upper jacket 7 to contact the outer peripheral surface of the upper jacket 7.

The first resistive force G1 which is generated by the first relative sliding can be adjusted by adjusting a friction force between the projections 43 and the outer peripheral surface of the upper jacket 7 and the strength of the projections 43. The projections 43 are disposed at equal intervals along a circumferential direction C of the outer peripheral surface of the upper jacket 7, which facilitates stabilizing the first resistive force G1. The first sliding member 40 further includes a pair of fixing portions 44 that fix the second sliding members 50. Each fixing portion 44 extends toward the radially outer side from opposite ends of the flange portion 42 in a radial direction R. The radial direction R refers to a radial direction about a center axis C2 of the upper jacket 7. The radially outer side refers to the direction away from the center axis C2 in the radial direction R. The pair of fixing portions 44 are disposed at positions 180° away from each other in the circumferential direction C so as to interpose the upper jacket 7 therebetween.

With reference to FIG. 5, an attachment part 100 such as a combination switch or a key lock is attached to the upper jacket 7. The attachment part 100 is attached on the axially upper side XU with respect to a portion of the upper jacket 7 to which the first sliding member 40 is attached. In addition, the steering system 1 further includes a facing member 101 fixed to the upper jacket 7 to face the first sliding member 40 from the steering member 2 side (axially upper side XU) in the column axial direction X. The lower end, in the axial direction, of the facing member 101 is positioned between the attachment part 100 and the first sliding member 40 in the upper jacket 7. The facing member 101 is a bracket or the like for attaching the attachment part 100 to the upper jacket 7, for example. Such a bracket is fixed to the upper jacket 7 by welding, caulking, press-fitting, or the like. The facing member 101 is not limited to a bracket for attaching the attachment part 100 to the upper jacket 7, and may be a bracket for attaching a vehicle part (such as a column cover, a wire harness, or a knee air bag, for example) other than the attachment part 100 to the upper jacket 7.

With reference to FIG. 3, the second sliding members 50 are plate-like members that extend from both ends of the first sliding member 40 toward the axially lower side XL. The second sliding members 50 are formed separately from the first sliding member 40, and thereafter fixed to the first sliding member 40 by welding or the like. Therefore, the second sliding members 50 are moved together with the first sliding member 40 in the column axial direction X. The second sliding members 50 are connected to the lower end surfaces, in the axial direction, of the fixing portions 44 of the first sliding member 40. The second sliding members 50 are moved together with the upper jacket 7, together with the first sliding member 40, during telescopic adjustment.

With reference to FIG. 5, the second sliding members 50 are spaced from each other in the tightening shaft direction J across the upper jacket 7, and face each other in the tightening shaft direction J. One of the second sliding members 50 is disposed between the first tightening member 32 and the first tightened portion 19 (the tightened portion 19 on the upper side in FIG. 5). The one of the second sliding members 50 is disposed between the first side plate 22 (the side plate 22 on the upper side in FIG. 5) and the first tightened portion 19. The other of the second sliding members 50 is disposed between the second tightening member 33 and the second tightened portion 19 (the tightened portion 19 on the lower side in FIG. 5). The other of the second sliding members 50 is disposed between the second side plate 22 (the side plate 22 on the lower side in FIG. 5) and the second tightened portion 19.

In a tightening state established by the tightening mechanism 18 (a state in which the lower jacket 8 tightens the upper jacket 7), the second sliding members 50 are pressed against the corresponding tightened portions 19 by the corresponding tightening members 32 and 33. A pressing direction P in which the tightening mechanism 18 presses the second sliding members 50 against the corresponding tightened portions 19 coincides with the tightening shaft direction J. A direction toward the corresponding tightened portion 19 in the pressing direction P is referred to as a downstream side in the pressing direction P.

The second sliding members 50 are pressed against the corresponding tightened portions 19 by the corresponding tightening members 32 and 33 to be held between the corresponding side plates 22 and the tightened portions 19. In this state, the second sliding members 50 are frictionally slidable with respect to the corresponding side plates 22 and the tightened portions 19. Frictional sliding between the pair of second sliding members 50 and the pair of side plates 22 and the pair of tightened portions 19 with the tightening mechanism 18 tightening the lower jacket 8 to the upper jacket 7 is referred to as second relative sliding. A resistive force generated by the second relative sliding is referred to as a second resistive force G2. The second resistive force G2 can be adjusted by adjusting a friction force between the second sliding members 50 and the side plates 22 and the tightened portions 19. In the first embodiment, the first resistive force G1 which is generated by the first relative sliding is larger than the second resistive force G2 which is generated by the second relative sliding (G1>G2).

With reference to FIG. 3, the second sliding members 50 each include a fixed portion 51 fixed to both ends of the first sliding member 40, and an extending portion 52 that extends in parallel with the column axial direction X. Each extending portion 52 includes a large width portion 53 coupled to the first sliding member 40 via the fixed portion 51, a small width portion 54, the width of which in the tilt direction Y (up-down direction) is smaller than that of the large width portion 53, and a coupling portion 55 that couples the large width portion 53 and the small width portion 54 to each other. The coupling portion 55 is configured such that the width thereof in the tilt direction Y becomes smaller from the large width portion 53 side (axially upper side XU) toward the small width portion 54 side (axially lower side XL).

The second sliding members 50 each have an axial long hole 56, through which the tightening shaft 21 is inserted and which is longitudinal in the column axial direction X. The axial long holes 56 are formed in the extending portions 52. With reference to FIG. 5, the second sliding members 50 are moved in the column axial direction X together with the upper jacket 7 during telescopic adjustment. The tightening shaft 21 is moved relative to the second sliding members 50 along the column axial direction X within the axial long holes 56. Portions of the second sliding members 50 that define the axial long holes 56 from the axially upper side XU are referred to as upper defining portions 56a. Portions of the second sliding members 50 that define the axial long holes 56 from the axially lower side XL are referred to as lower defining portions 56b.

A space is provided between the tightening shaft 21 and the upper defining portions 56a and the lower defining portions 56b of the axial long holes 56 with the upper jacket 7 positioned at any position within the telescopic adjustment range. Particularly, the tightening shaft 21 and the upper defining portions 56a of the axial long holes 56 do not contact each other even when the upper jacket 7 is located at the lower-limit adjustment position during telescopic adjustment. The tightening shaft 21 and the lower defining portions 56b of the axial long holes 56 do not contact each other even when the upper jacket 7 is located at the upper-limit adjustment position during telescopic adjustment.

The extending portions 52 each include an inclined portion 58 inclined with respect to the column axial direction X toward the downstream side in the pressing direction P as the extending portion 52 extends away from the first sliding member 40 (toward the axially lower side XL). The inclined portions 58 are positioned on the first sliding member 40 side with respect to the large width portions 53. In the second sliding members 50, portions of the extending portions 52 that face the tightening members 32 and 33 (portions that surround the axial long holes 56) are held particularly strongly between the side plates 22 and the tightened portions 19. Therefore, during second relative sliding, the portions of the extending portions 52 that surround the axial long holes 56 and the side plates 22 and the tightened portions 19 mainly frictionally slide with respect to each other. The portions of the extending portions 52 that surround the axial long holes 56 constitute sliding portions 57 that mainly frictionally slide with respect to the side plates 22 and the tightened portions 19.

Next, operation of the steering system 1 at the time of a secondary collision that occurs when the vehicle collides will be described. A secondary collision refers to a collision of the driver of the vehicle against the steering member 2 at the time of a vehicle collision. In the following, a case where a secondary collision has occurred with the upper jacket 7 located at the upper-limit adjustment position is assumed unless specifically described. When a secondary collision occurs in a tightening state established by the tightening mechanism 18, a shock is transferred to the upper jacket 7 via the steering member 2. The lower jacket 8 is supported by the pair of side plates 22 of the support member 17 which is fixed to the vehicle body 13. Therefore, at the time of a secondary collision, the upper jacket 7 is moved toward the axially lower side XL with respect to the support member 17 and the lower jacket 8. Consequently, the column jacket 6 is contracted while frictionally sliding the upper jacket 7 with respect to the lower jacket 8. A resistive force of frictional sliding of the upper jacket 7 with respect to the lower jacket 8 generated during tightening by the tightening mechanism 18 is referred to as a column resistive force F.

Figure 6A:
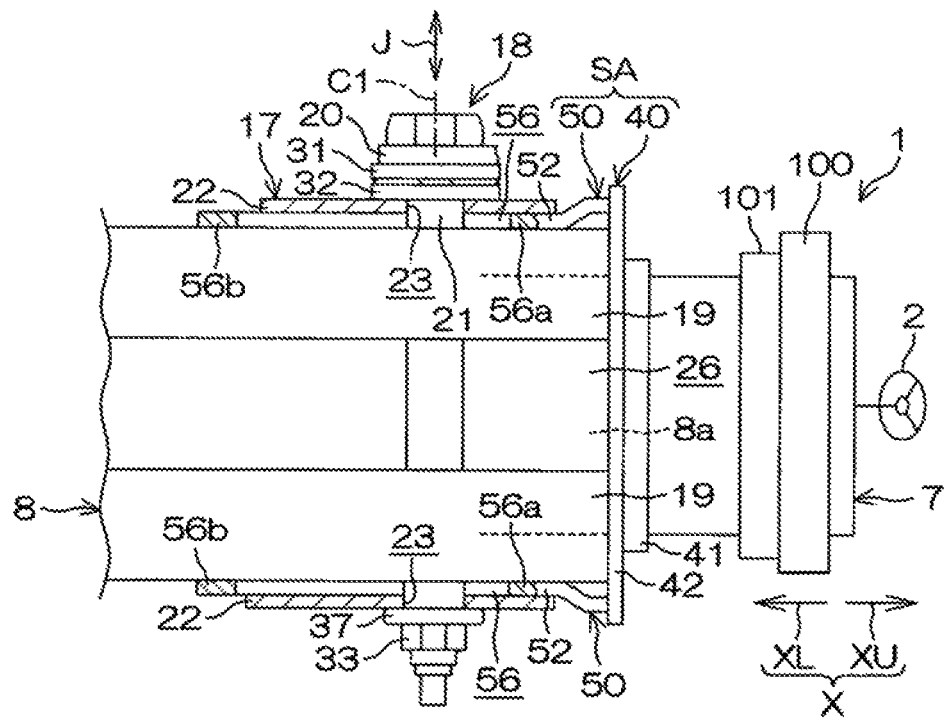
FIGS. 6A and 6B are schematic views illustrating how the shock absorption mechanism and the surrounding components operate when a secondary collision has occurred.
Figure 6B:
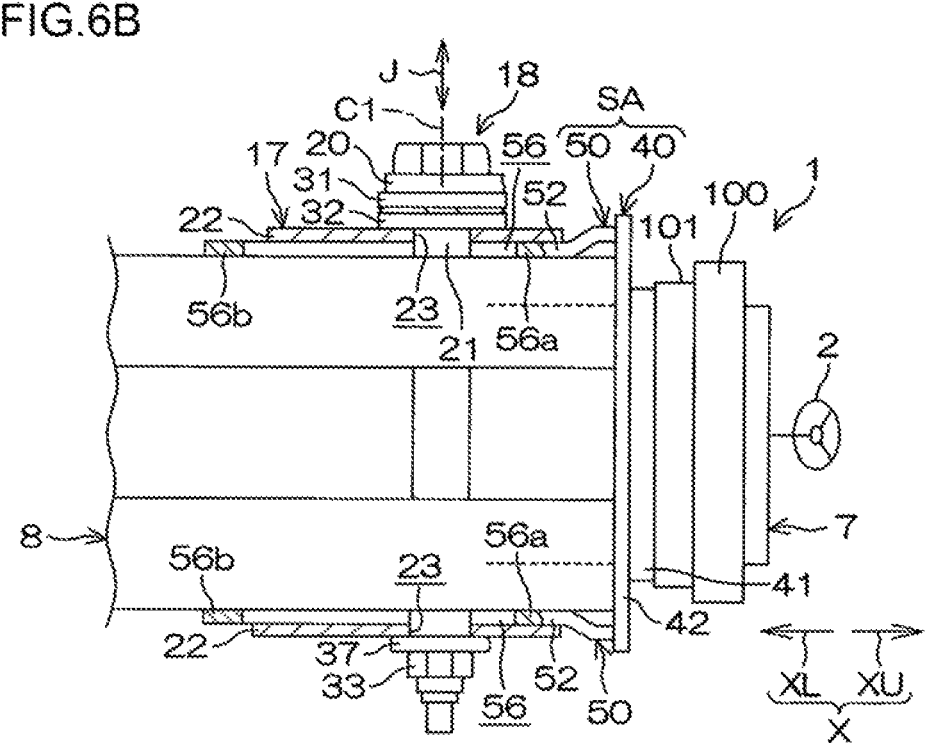
Figure 7A:
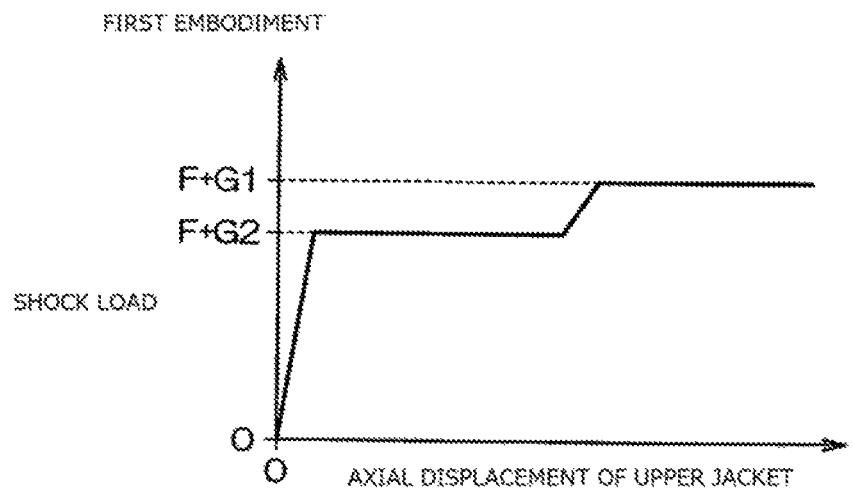
FIG. 7A is a graph illustrating the relationship between the axial displacement of an upper jacket and the shock load at a time when a secondary collision has occurred in the steering system according to the first embodiment.

FIGS. 6A and 6B are schematic views illustrating how the shock absorption mechanism SA and the surrounding components operate when a secondary collision has occurred. FIG. 6B illustrates a state after the state illustrated in FIG. 6A. FIG. 7A is a graph illustrating the relationship between the axial displacement of the upper jacket 7 and the shock load at the time when a secondary collision has occurred. In FIG. 7A, the horizontal axis indicates the axial displacement of the upper jacket 7, and the vertical axis indicates the shock load (the same also applies to FIGS. 7B, 9, 11, 19, 21A, and 21B to be discussed later). On the horizontal axis, the position of the upper jacket 7 in the column axial direction X at which the column jacket 6 is most expanded (at which the upper jacket 7 is positioned at the upper-limit adjustment position) is defined as the origin (the same also applies to FIGS. 7B, 9, 11, 19, 21A, and 21B to be discussed later).

In the first embodiment, the first resistive force G1 which is generated by the first relative sliding is larger than the second resistive force G2 which is generated by the second relative sliding, and thus the second relative sliding is started first. The second sliding members 50 each function as a second resistive force generation unit that generates the second resistive force G2 by performing the second relative sliding with respect to the corresponding side plate 22 of the support member 17 and the corresponding tightened portion 19 of the lower jacket 8 at the time of a secondary collision. In the second relative sliding, a position of the sliding portion 57 is varied with the second sliding members 50 moved with respect to the support member 17 and the lower jacket 8. Specifically, the sliding portion 57 is moved toward the first sliding member 40 (axially upper side XU) along with the lapse of time after a secondary collision is started.

The shock load in the initial stage of a secondary collision corresponds to the sum of the second resistive force G2 which is generated by the second relative sliding and the column resistive force F which is generated when the upper jacket 7 frictionally slides with respect to the lower jacket 8 (see FIG. 7A). In the middle of the second relative sliding, the lower end, in the axial direction, of the guide groove 27 and the guided protrusion 28 abut against each other to break the guided protrusion 28. The second relative sliding is continued also after the guided protrusion 28 is broken. Therefore, the second relative sliding is started immediately after the occurrence of a secondary collision, irrespective of the position of the upper jacket 7 after telescopic adjustment.

Then, as illustrated in FIG. 6A, the first sliding member 40 and the axially upper end 8a of the lower jacket 8 abut against each other. Consequently, movement of the first sliding member 40 and the second sliding members 50 toward the axially lower side XL with respect to the lower jacket 8 and the support member 17 is regulated. Consequently, movement of the second sliding members 50 with respect to the support member 17 and the lower jacket 8 is terminated. That is, the second relative sliding is stopped. The axially upper end 8a of the lower jacket 8 functions as a second stopper that stops the second relative sliding. On the other hand, the upper jacket 7 is continuously moved toward the axially lower side XL with respect to the lower jacket 8. Therefore, relative movement (first relative sliding) between the upper jacket 7 and the first sliding member 40 is started. The first sliding member 40 functions as a first resistive force generation unit that generates a first resistive force by performing the first relative sliding with respect to the upper jacket 7 at the time of a secondary collision.

The shock load after the first relative sliding has been started corresponds to the sum of the first resistive force G1 which is generated by the first relative sliding and the column resistive force F which is generated when the upper jacket 7 frictionally slides with respect to the lower jacket 8 (see FIG. 7A). The first relative sliding is stopped when the facing member 101 abuts against the first sliding member 40 from the axially upper side XU (see FIG. 6B). In this way, the second relative sliding is caused in the initial stage of a secondary collision, and the first relative sliding is caused in the final stage of the secondary collision. When the column jacket 6 is contracted at the time of a secondary collision, the shock at the time of a secondary collision is absorbed by the first relative sliding and the second relative sliding.

In the first embodiment, at the time of a secondary collision, the first sliding member 40 generates the first resistive force G1 by performing the first relative sliding with respect to the upper jacket 7. At the time of a secondary collision, in addition, the second resistive force G2 is generated with the pair of second sliding members 50, which are moved together with the first sliding member 40, performing the second relative sliding with respect to the pair of side plates 22 of the support member 17 and the pair of tightened portions 19 of the lower jacket 8. That is, the first sliding member 40 and the second sliding members 50, which are moved together with each other, are slidable with respect to the upper jacket 7 and the support member 17 (lower jacket 8), respectively, which are moved relative to each other at the time of a secondary collision. Therefore, at the time of a secondary collision, the first relative sliding or the second relative sliding is caused at the same time as movement between the lower jacket 8 and the upper jacket 7 is started.

In the first embodiment, the first resistive force G1 which is generated by the first relative sliding is larger than the second resistive force G2 which is generated by the second relative sliding, and therefore the second relative sliding is caused at the same time as movement of the upper jacket 7 with respect to the lower jacket 8 is started. Thus, the shock at the time of a secondary collision starts being absorbed sufficiently by the column resistive force F and the second resistive force G2 immediately after the occurrence of the secondary collision. Hence, an increased total amount of shock at the time of a secondary collision can be absorbed. Then, when the second relative sliding is stopped, the first relative sliding is started in order to absorb the shock at the time of a secondary collision.

The shock load can be controlled easily in accordance with the axial displacement of the upper jacket 7 with respect to the lower jacket 8 by adjusting the resistive forces G1 and G2, which are required for the first relative sliding and the second relative sliding, to respective desired values. For example, the shock load can be varied stepwise in accordance with the axial displacement of the upper jacket 7 with respect to the lower jacket 8 just by adjusting the first resistive force G1 and the second resistive force G2 to constant values that are different from each other. There is no need to perform processing so as to increase the diameter of the upper jacket 7 stepwise.

As a result, an increased amount of shock at the time of a secondary collision can be absorbed, and the shock load can be set appropriately. In the first embodiment, in addition, the first resistive force G1 which is generated by the first relative sliding is larger than the second resistive force G2 which is generated by the second relative sliding. Therefore, the second relative sliding is started immediately after the occurrence of a secondary collision. The second relative sliding is stopped by the axially upper end 8a (second stopper) of the lower jacket 8.

Particularly, when the upper jacket 7 is moved toward the axially lower side XL with respect to the lower jacket 8 at the time of a secondary collision, the axially upper end 8a (second stopper) of the lower jacket 8 abuts against the first sliding member 40. The second sliding members 50 are moved together with the first sliding member 40, and therefore movement of the first sliding member 40 with respect to the support member 17 is terminated at the same time as the second relative sliding is stopped. Also after that, the upper jacket 7 is urged to be further moved toward the axially lower side XL with respect to the support member 17, and therefore the upper jacket 7 is moved toward the axially lower side XL with respect to the first sliding member 40. Consequently, the first relative sliding is started at the same time as the second relative sliding is stopped.

Figure 7B:
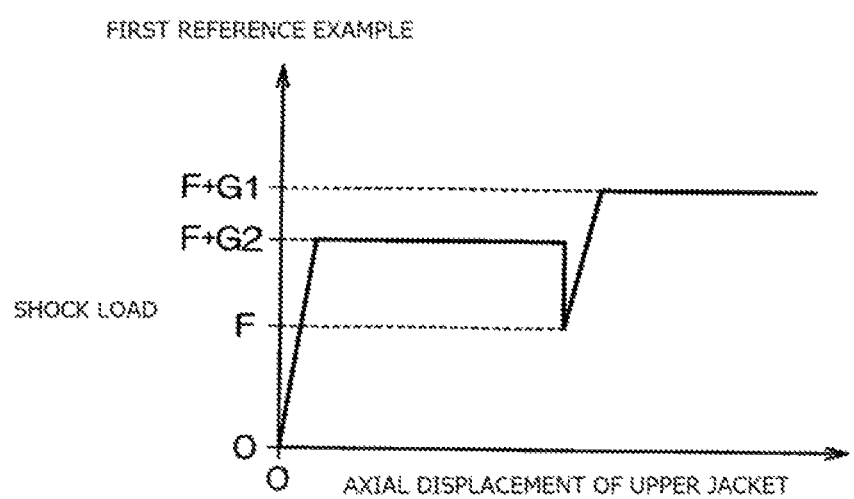
FIG. 7B is a graph illustrating the relationship between the axial displacement of an upper jacket and the shock load at the time when a secondary collision has occurred in a steering system according to a first reference example.

On the other hand, in a steering system configured in accordance with a first reference example in which the first resistive force G1 is larger than the second resistive force G2 and the second sliding members 50 are not moved together with the first sliding member 40 in the column axial direction X, unlike the present embodiment, the first relative sliding is not necessarily started instantly after the second relative sliding is stopped. Therefore, as indicated in FIG. 7B, the shock load is occasionally lowered abruptly from the sum of the second resistive force G2 and the column resistive force F to the column resistive force F after the stop of the second relative sliding and before the start of the first relative sliding. Thus, with the steering system configured in accordance with the first reference example, the shock at the time of a secondary collision may not be absorbed smoothly. In the present embodiment, on the other hand, the first relative sliding is started instantly when the second relative sliding is stopped. Therefore, a reduction in resistive force (shock load) due to the stop of the second relative sliding can be suppressed as indicated in FIG. 7A. Thus, the shock at the time of a secondary collision can be absorbed smoothly.

In the first embodiment, in addition, as discussed earlier, the second relative sliding is started immediately after the occurrence of a secondary collision, and the first relative sliding is started instantly after the second relative sliding is stopped. The first sliding member 40 abuts against the facing member 101, which is fixed to the upper jacket 7, to be received by the facing member 101. Therefore, the first sliding member 40 is moved together with the upper jacket 7. Here, a case where the first relative sliding is started with the second relative sliding accidentally stopped before the second relative sliding over a distance set in advance is completed is assumed. Even in this case, the first sliding member 40 which has been received by the facing member 101 is moved together with the upper jacket 7 after the first relative sliding is stopped. Consequently, the second sliding members 50 which are moved together with the first sliding member 40 are moved with respect to the lower jacket 8 and the support member 17 to cause the second relative sliding again. Therefore, the second relative sliding over the distance set in advance is finally completed even in the case where the first relative sliding has been started with the second relative sliding accidentally stopped. Therefore, the total amount of shock at the time of a secondary collision to be absorbed is stabilized.

In the first embodiment, in addition, the second sliding members 50 are disposed between the corresponding tightening members 32 and 33 and the corresponding tightened portions 19 of the lower jacket 8. Therefore, movement of the second sliding members 50 in the direction (corresponding to the tightening shaft direction J) in which the corresponding tightened portions 19 and the corresponding tightening members 32 and 33 face each other is regulated. A backlash of the first sliding member 40, which is moved together with the second sliding members 50, during the first relative sliding is suppressed. Thus, the shock load at the time of a secondary collision can be stabilized.

Further, a component in the tightening shaft direction J is included in the circumferential direction C of the upper jacket 7. Therefore, relative rotation between the upper jacket 7 and the lower jacket 8 about the circumferential direction C can be regulated by a simple configuration in which the second sliding members 50 are disposed between the support member 17 and the lower jacket 8 in the tightening shaft direction J. During telescopic adjustment, in addition, the upper jacket 7 is prevented from slipping out of the lower jacket 8 with the guided protrusion 28 and the axially upper end of the guide groove 27 contacting each other. After the guided protrusion 28 is broken by a secondary collision, however, the guided protrusion 28 and the guide groove 27 do not function to prevent slipping. However, the tightening shaft 21 is inserted through the axial long holes 56 of the second sliding members 50 which are attached to the upper jacket 7 via the first sliding member 40.

Therefore, after the guided protrusion 28 is broken by a secondary collision, the upper jacket 7 is prevented from slipping out with the tightening shaft 21 and the lower defining portions 56*b* of the axial long holes 56 contacting each other. In this way, the first sliding member 40 and the second sliding members 50 also serve as a slipping prevention member that prevents the upper jacket 7 from slipping out after a secondary collision. Thus, there is no need to provide a slipping prevention member separately from the first sliding member 40 and the second sliding members 50, achieving a simplified configuration and a reduction in number of parts.

In the first embodiment, in addition, in each of the extending portions 52 of the second sliding members 50, the coupling portion 55 which couples the large width portion 53 and the small width portion 54 to each other is configured such that the width of the coupling portion 55 in the tilt direction Y becomes smaller from the large width portion 53 side toward the small width portion 54 side. Therefore, a stress generated in the extending portion 52 when a load in the tilt direction Y acts on the extending portion 52 at the time of a secondary collision is dispersed to the boundary between the fixed portion 51 and the large width portion 53 and the coupling portion 55. That is, concentration of the stress on one location of the extending portion 52 (e.g. the boundary between the fixed portion 51 and the large width portion 53) can be avoided. Therefore, deformation of the second sliding members 50 at the time of a secondary collision can be suppressed, and thus the shock load at the time of a secondary collision can be stabilized.

In the first embodiment, in addition, the first relative sliding is started when the first sliding member 40 is pressed toward the axially upper side XU by the axially upper end 8*a* of the lower jacket 8. In this event, the axially upper end 8*a* of the lower jacket 8 presses the fitted portion 41 over a wide range in the circumferential direction C (a region excluding a region in which the slit 26 is provided in the circumferential direction C). Therefore, the first resistive force G1 which is generated by the first relative sliding is stabilized.

In the first embodiment, in addition, the extending portions 52 each include the inclined portion 58 which is inclined with respect to the column axial direction X toward the downstream side in the pressing direction P as the extending portion 52 extends away from the first sliding member 40. Therefore, a component force toward the downstream side in the pressing direction P acts on the second sliding members 50 when the second sliding members 50 receive a load in the column axial direction X at the time of a secondary collision because of a friction force generated by the second relative sliding. Thus, the second sliding members 50 are further pressed against the corresponding tightened portions 19 at the time of a secondary collision, and thus are not easily buckled. Hence, the shock load at the time of a secondary collision is stabilized.

In the first embodiment, in addition, the second sliding members 50 are connected to the lower end surfaces, in the axial direction, of the fixing portions 44 of the first sliding member 40. In this case, the distance between the first sliding member 40 and the second sliding members 50 and the facing member 101 can be increased compared to a configuration in which the second sliding members 50 are connected to the upper end surfaces, in the axial direction, of the fixing portions 44 of the first sliding member 40. That is, the distance over which the first sliding member 40 is moved by the first relative sliding can be increased. Hence, the shock load can be set more appropriately.

Figure 8:
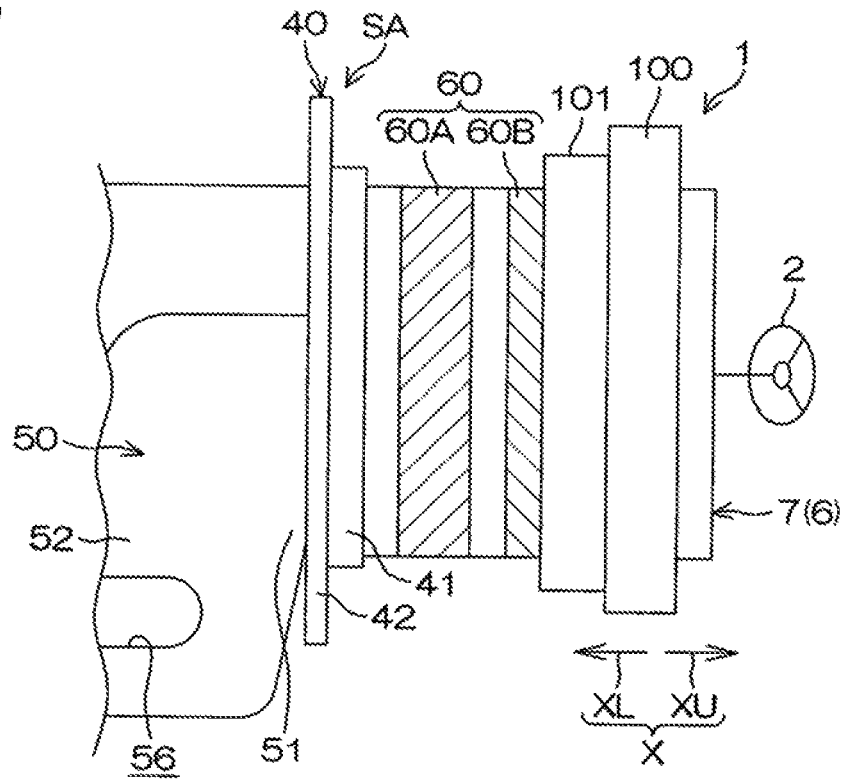
FIG. 8 is a schematic side view of an upper jacket and surrounding components of a steering system according to a first modification of the first embodiment.
Figure 9:
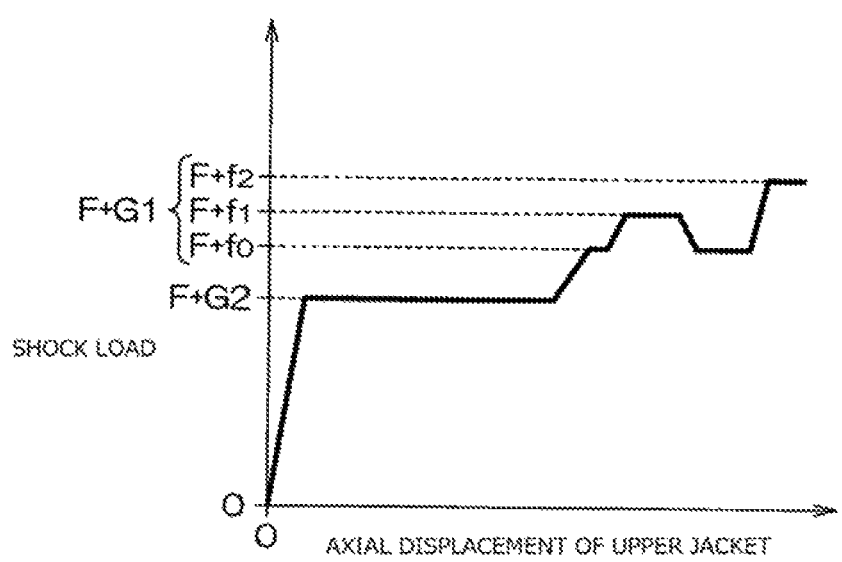
FIG. 9 is a graph illustrating the relationship between the axial displacement of the upper jacket and the shock load at the time when a secondary collision has occurred in the steering system according to the first modification.

Next, a first modification of the first embodiment will be described. FIG. 8 is a schematic side view of an upper jacket 7 and surrounding components of a steering system 1 according to a first modification of the first embodiment. FIG. 9 is a graph illustrating the relationship between the axial displacement of the upper jacket 7 and the shock load at the time when a secondary collision has occurred in the steering system 1 according to the first modification. In FIGS. 8 and 9, the same members as the members that have been described so far are given the same reference numerals to omit description.

With reference to FIG. 8, a coating 60 that changes the sliding load between the outer peripheral surface of the upper jacket 7 and the first sliding member 40 has been applied to the outer peripheral surface of the upper jacket 7 of the steering system 1 according to the first modification. In FIG. 8, for convenience of description, the coating 60 is illustrated as hatched. In this modification, the coating 60 increases the sliding load between the outer peripheral surface of the upper jacket 7 and the first sliding member 40.

The coating 60 is provided at two locations between the first sliding member 40 and the facing member 101 on the outer peripheral surface of the upper jacket 7, with a clearance therebetween. The coating 60 extends over the entire region, in the circumferential direction, of the outer peripheral surface of the upper jacket 7. The coating 60 which is the closer to the first sliding member 40 (on the axially lower side XL) is referred to as a first coating 60A. The coating 60 which has been applied at a position farther from the first sliding member 40 than the first coating 60A (on the axially upper side XU) is referred to as a second coating 60B. A portion of the upper jacket 7 to which the second coating 60B has been applied is adjacent to a portion of the upper jacket 7 to which the facing member 101 has been attached.

As indicated in FIG. 9, a resistive force f1 generated by frictional sliding of the first sliding member 40 with respect to the portion to which the first coating 60A has been applied is larger than a resistive force f0 generated by frictional sliding of the first sliding member 40 with respect to a portion to which the coating 60 has not been applied. A resistive force f2 generated by frictional sliding of the first sliding member 40 with respect to the portion to which the second coating 60B has been applied is larger than the resistive force f1 which is generated by frictional sliding between the portion to which the first coating 60A has been applied and the first sliding member 40. Therefore, in the first relative sliding, the first resistive force G1 which is generated by the first relative sliding is fluctuated in accordance with variations in relative positions of the upper jacket 7 and the first sliding member 40. The coating 60 (the first coating 60A and the second coating 60B) which has been applied to the outer peripheral surface of the upper jacket 7 functions as a first fluctuation unit that fluctuates the first resistive force G1 in accordance with variations in relative positions of the upper jacket 7 and the first sliding member 40. Therefore, the shock load can be set further appropriately.

In the first modification, in addition, the second coating 60B which increases the friction load between the outer peripheral surface of the upper jacket 7 and the first sliding member 40 is adjacent to the facing member 101 from the axially lower side XL. Therefore, the relative speeds of the first sliding member 40 and the upper jacket 7 can be reduced efficiently immediately before the first sliding member 40 and the upper jacket 7 abut against each other when the first relative sliding is terminated.

In the configuration in which the first resistive force G1 is adjusted by the coating 60, in addition, the value of the first resistive force G1 can be predicted easily compared to a configuration in which the first resistive force G1 is adjusted in accordance with the degree of pressing of the first sliding member 40 against the upper jacket 7. Therefore, the first resistive force G1 which is generated by the first relative sliding can be easily set to a desired value.

Unlike the first modification, the coating 60 may be applied to a part, in the circumferential direction C, of the outer peripheral surface of the upper jacket 7. Unlike the first modification, in addition, surface processing such as surface roughening may be applied to the outer peripheral surface of the upper jacket 7 at the same positions as those of the coating 60 in the first modification, instead of applying the coating 60 to the outer peripheral surface of the upper jacket 7, to form minute uneven portions on the outer peripheral surface of the upper jacket 7. In this case, the uneven portions function as the first fluctuation unit.

Figure 10:
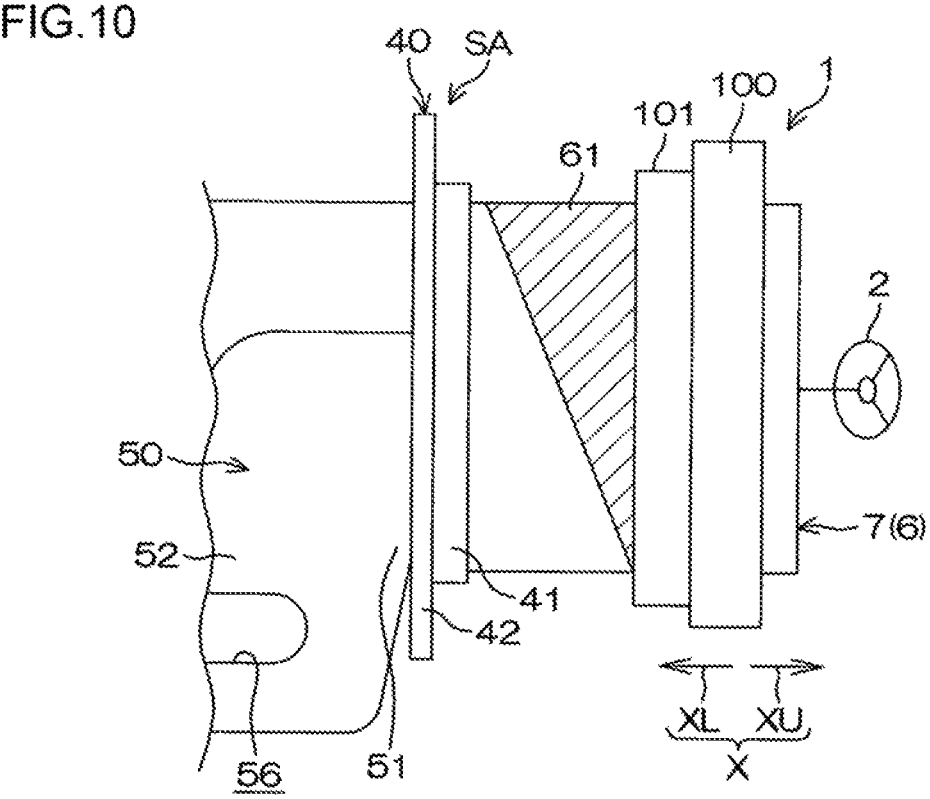
FIG. 10 is a schematic side view of an upper jacket and surrounding components of a steering system according to a second modification of the first embodiment.
Figure 11:
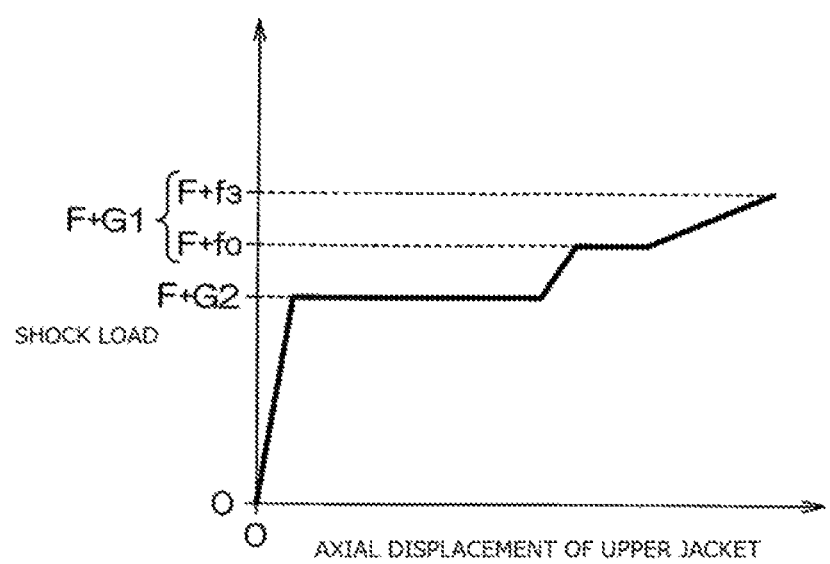
FIG. 11 is a graph illustrating the relationship between the axial displacement of an upper jacket and the shock load at the time when a secondary collision has occurred in the steering system according to the second modification.

Next, a second modification of the first embodiment will be described. FIG. 10 is a schematic side view of an upper jacket 7 and surrounding components of a steering system 1 according to the second modification. FIG. 11 is a graph illustrating the relationship between the axial displacement of the upper jacket 7 and the shock load at the time when a secondary collision has occurred in the steering system 1 according to the second modification. In FIGS. 10 and 11, the same members as the members that have been described so far are given the same reference numerals to omit description.

As illustrated in FIG. 10, as in the first modification, a coating 61 that changes the sliding load between the outer peripheral surface of the upper jacket 7 and the first sliding member 40 has been applied to the outer peripheral surface of the upper jacket 7 of the steering system 1 according to the second modification. In FIG. 10, for convenience of description, the coating 61 is illustrated as hatched. The coating 61 according to the second modification is different from the coating 60 according to the first modification in that the area over which the coating 61 has been applied on the outer peripheral surface of the upper jacket 7 differs in accordance with the position in the column axial direction X. In the second modification, the area over which the coating 61 has been applied is increased toward the axially upper side XU. The coating 61 is in the shape of a triangle that has a vertex on the axially lower side XL as viewed from a side (as seen from the tightening shaft direction J), for example. A portion of the upper jacket 7 to which the coating 61 has been applied is adjacent to a portion of the upper jacket 7 to which the facing member 101 has been attached.

At the time of a secondary collision, as illustrated in FIG. 11, the first resistive force G1 which is generated by the first relative sliding is gradually increased since the time when frictional sliding between the portion to which the coating 61 has been applied and the first sliding member 40 has been started. When the first resistive force G1 has reached a maximum value f3, the first sliding member 40 abuts against the facing member 101, and the first relative sliding is stopped. In this way, the coating 61 which has been applied to the outer peripheral surface of the upper jacket 7 functions as the first fluctuation unit which fluctuates the first resistive force G1 in accordance with variations in relative positions of the upper jacket 7 and the first sliding member 40. Therefore, the shock load can be set further appropriately.

Unlike the second modification, surface processing such as surface roughening may be applied to the outer peripheral surface of the upper jacket 7 at the same positions as those of the coating 61, instead of applying the coating 61 to the outer peripheral surface of the upper jacket 7, to form minute uneven portions on the outer peripheral surface of the upper jacket 7. In this case, the uneven portions function as the first fluctuation unit.

Figure 12A:
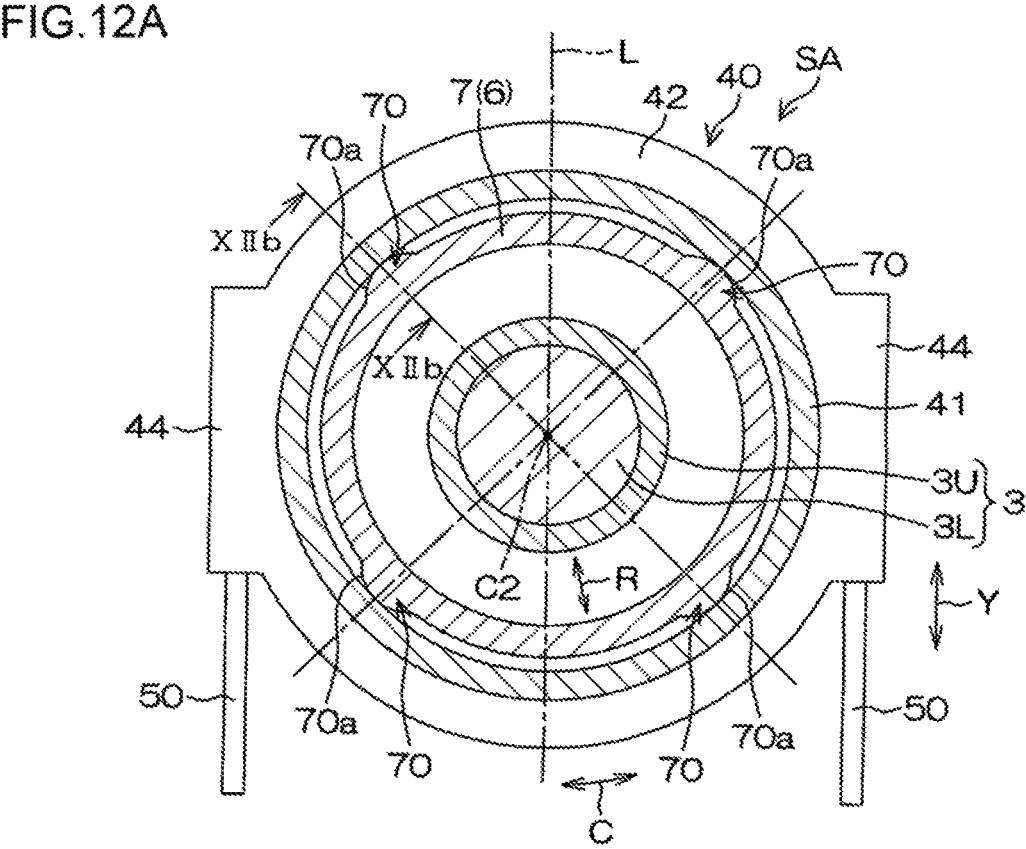
FIG. 12A is a schematic cross-sectional view of a first sliding member and surrounding components of a steering system according to a third modification of the first embodiment.
Figure 12B:
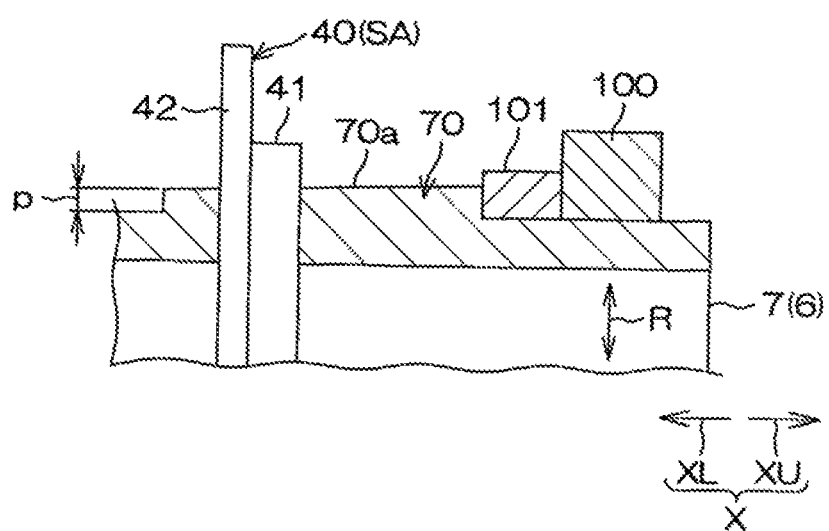
FIG. 12B is a schematic view illustrating a sectional surface taken along the line XIIb-XIIb in FIG. 12A.

Next, a third modification of the first embodiment will be described. FIG. 12A is a schematic cross-sectional view of a first sliding member 40 and surrounding components of a steering system 1 according to the third modification. FIG. 12B is a schematic view illustrating a sectional surface taken along the line XIIb-XIIb in FIG. 12A. In FIGS. 12A and 12B, the same members as the members that have been described so far are given the same reference numerals to omit description. With reference to FIG. 12A, a plurality of (four in this modification) protrusions 70 are formed on the outer peripheral surface of the upper jacket 7 of the steering system 1 according to the third modification. The protrusions 70 each have an arcuate surface 70a. The protrusions 70 are disposed at equal intervals in the circumferential direction C of the outer peripheral surface of the upper jacket 7. The protrusions 70 are in the shape of a streak that extends in the column axial direction X. The protrusions 70 extend over the entire relative movement region of the first sliding member 40 (see FIG. 12B). The relative movement region of the first sliding member 40 refers to a region in which the first sliding member 40 is relatively movable in the column axial direction X on the outer peripheral surface of the upper jacket 7.

The first sliding member 40 does not include the projections 43, and the inner peripheral surface of the fitted portion 41 contacts the arcuate surfaces 70a of the protrusions 70. An amount of projection p of the protrusions 70 from the outer peripheral surface of the upper jacket 7 differs in accordance with the position, in the column axial direction X, within the protrusions 70. The amount of projection p of the protrusions 70 refers to the distance from the outer peripheral surface of the upper jacket 7 to the distal ends of the protrusions 70 in the radial direction R of the outer peripheral surface of the upper jacket 7. The amount of projection p of the protrusions 70 has been changed in accordance with the position, in the column axial direction X, within the protrusions 70. Therefore, at the time of a secondary collision, the first resistive force G1 is fluctuated in accordance with variations in relative positions of the upper jacket 7 and the first sliding member 40. Specifically, the first resistive force G1 is increased by increasing the amount of projection p, and the first resistive force G1 is reduced by reducing the amount of projection p. In this way, the plurality of protrusions 70 which are provided on the outer peripheral surface of the upper jacket 7 function as the first fluctuation unit. Therefore, the shock load can be set further appropriately.

Unlike the third modification, the protrusions 70 may be provided in a part of the relative movement region of the first sliding member 40, rather than being provided over the entire relative movement region of the first sliding member 40. In this case, the relative movement region of the first sliding member 40 includes both a region in which the protrusions 70 are provided and a region in which the protrusions 70 are not provided. Therefore, the first resistive force G1 which is generated by the first relative sliding can be fluctuated in accordance with the presence or absence of the protrusions 70.

The plurality of protrusions 70 are preferably disposed so as to be line-symmetrical with respect to a line L that extends in the tilt direction Y through the center axis C2 of the upper jacket 7. In the case where the number of the protrusions 70 is three unlike the third modification, preferably, one protrusion 70 is disposed on the line L, and one protrusion 70 is disposed on each of both sides of the line L. In the case where the number of the protrusions 70 is an even number of four or more, at least a pair of protrusions 70 are preferably disposed on a line (including the line L) that passes through the center axis C2.

Figure 13A:
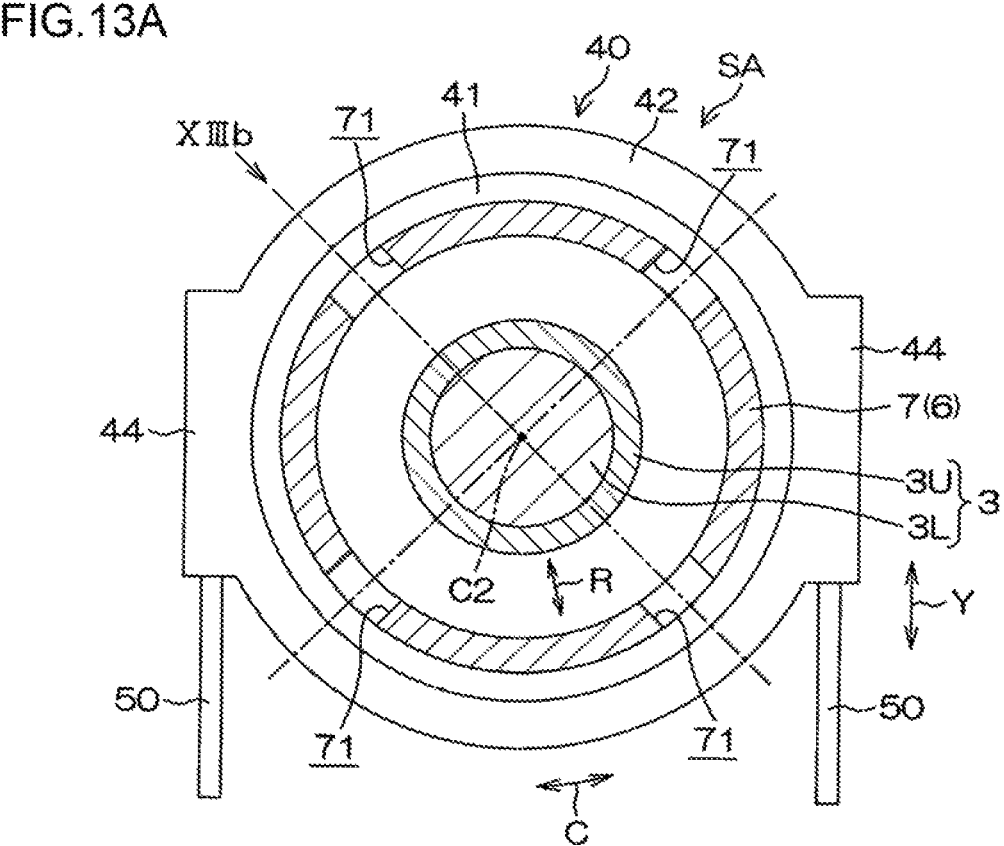
FIG. 13A is a schematic cross-sectional view of a first sliding member and surrounding components of a steering system according to a fourth modification of the first embodiment.
Figure 13B:
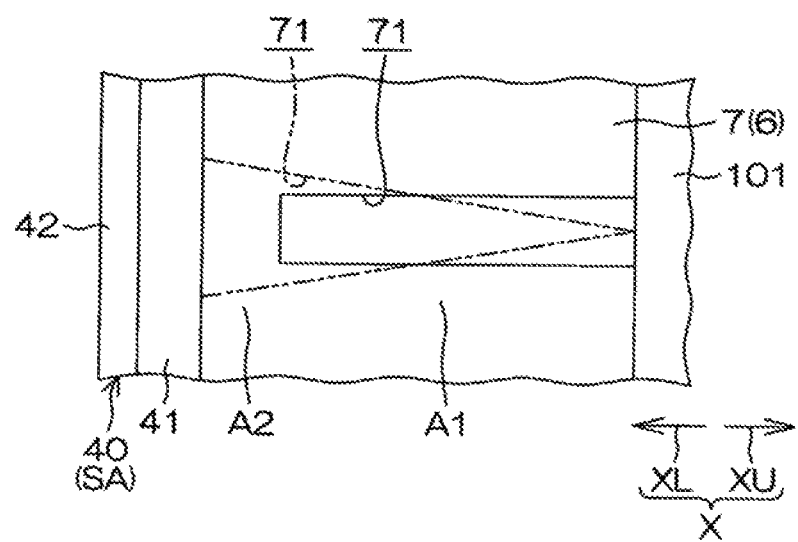
FIG. 13B is a schematic view of the outer peripheral surface of an upper jacket as seen from the arrow XIIIb in FIG. 13A.

Unlike the third modification, the protrusions 70 may each be generally in the form of a trapezoid that is tapered outward in the radial direction R. In addition, there is no need to provide a plurality of protrusions 70, and only one protrusion 70 may be provided. Next, a fourth modification of the first embodiment will be described. FIG. 13A is a schematic cross-sectional view of a first sliding member 40 and surrounding components of a steering system 1 according to the fourth modification. FIG. 13B is a schematic view of the outer peripheral surface of an upper jacket 7 as seen from the arrow XIIIb in FIG. 13A. In FIGS. 13A and 13B, the same members as the members that have been described so far are given the same reference numerals to omit description.

With reference to FIG. 13A, a plurality of recessed portions 71 are provided in the outer peripheral surface of the upper jacket 7 in the steering system 1 according to the fourth modification. The recessed portions 71 are disposed at equal intervals in the circumferential direction C of the outer peripheral surface of the upper jacket 7. The recessed portions 71 penetrate the upper jacket 7 in the radial direction R. With reference to FIG. 13B, the recessed portions 71 are in the shape of a streak that extends in the column axial direction X. The recessed portions 71 are provided in a part of the relative movement region of the first sliding member 40, rather than being provided over the entire relative movement region of the first sliding member 40. In this case, the relative movement region of the first sliding member 40 includes both a region A1 in which the recessed portions 71 are provided and a region A2 in which the recessed portions 71 are not provided. Therefore, at the time of a secondary collision, the first resistive force G1 which is generated by the first relative sliding can be fluctuated in accordance with the presence or absence of the recessed portions 71. In this way, the recessed portions 71 which are provided in the outer peripheral surface of the upper jacket 7 function as the first fluctuation unit which fluctuates the first resistive force G1 in accordance with variations in relative positions of the upper jacket 7 and the first sliding member 40. Therefore, the shock load can be set further appropriately.

Unlike the fourth modification, the first resistive force G1 may be fluctuated by varying the number of the recessed portions 71 within the relative movement region of the first sliding member 40. In addition, the recessed portions 71 may be provided such that the width thereof in the circumferential direction C is varied in accordance with the position in the column axial direction X as indicated by the long dashed double-short dashed line in FIG. 13B. If the recessed portions 71 are shaped in this way, the first resistive force G1 is fluctuated in accordance with variations in relative positions of the upper jacket 7 and the first sliding member 40 even if the recessed portions 71 are provided in the entire relative movement region of the first sliding member 40.

Unlike the fourth modification, the plurality of recessed portions 71 may differ from each other in length in the column axial direction X. In addition, there is no need to provide a plurality of recessed portions 71, and only one recessed portion 71 may be provided. In addition, the recessed portions 71 are not required to penetrate the upper jacket 7, and may be bottomed grooves. Next, a fifth modification of the first embodiment will be described.

Figure 14:
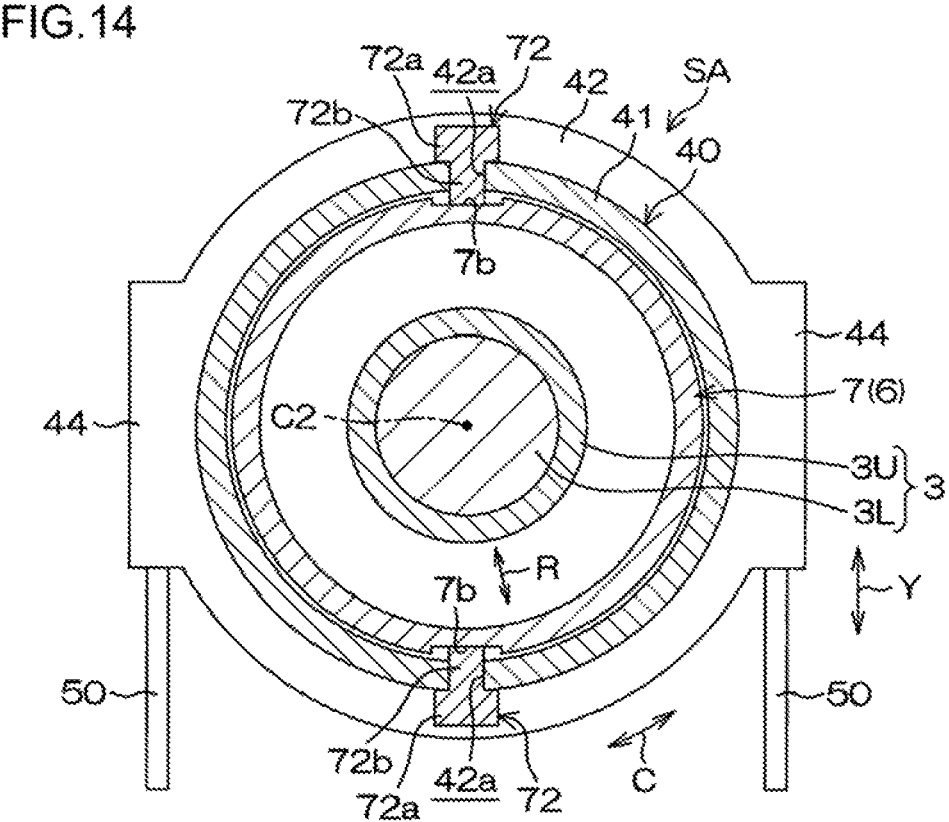
FIG. 14 is a schematic cross-sectional view of a first sliding member and surrounding components of a steering system according to a fifth modification of the first embodiment.

FIG. 14 is a schematic cross-sectional view of a first sliding member 40 and surrounding components of a steering system 1 according to the fifth modification. In FIG. 14, the same members as the members that have been described so far are given the same reference numerals to omit description. In the steering system 1 according to the fifth modification, as illustrated in FIG. 14, the first sliding member 40 does not include the plurality of projections 43, and the first sliding member 40 includes bolts 72 inserted through insertion holes 42a formed in the fitted portion 41.

A plurality of bolts 72 may be provided along the circumferential direction C. The bolts 72 each include a head portion 72a and a shaft portion 72b that extends from the head portion 72a toward the outer peripheral surface of the upper jacket 7. The distal ends of the shaft portions 72b abut against the outer peripheral surface of the upper jacket 7. The first sliding member 40 frictionally slides with respect to the upper jacket 7 with the distal ends of the shaft portions 72b and the outer peripheral surface of the upper jacket 7 frictionally sliding with respect to each other. The first resistive force G1 can be set to a desired value by adjusting the degree to which the bolts 72 are tightened.

Portions of the outer peripheral surface of the upper jacket 7 against which the distal ends of the shaft portions 72b abut are each formed with a flat surface 7b that extends in the column axial direction X. Consequently, the first resistive force G1 which is generated by the first relative sliding can be stabilized. In order to stabilize the first resistive force G1 which is generated by the first relative sliding, the plurality of bolts 72 are preferably disposed at equal intervals in the circumferential direction C.

Figure 15:
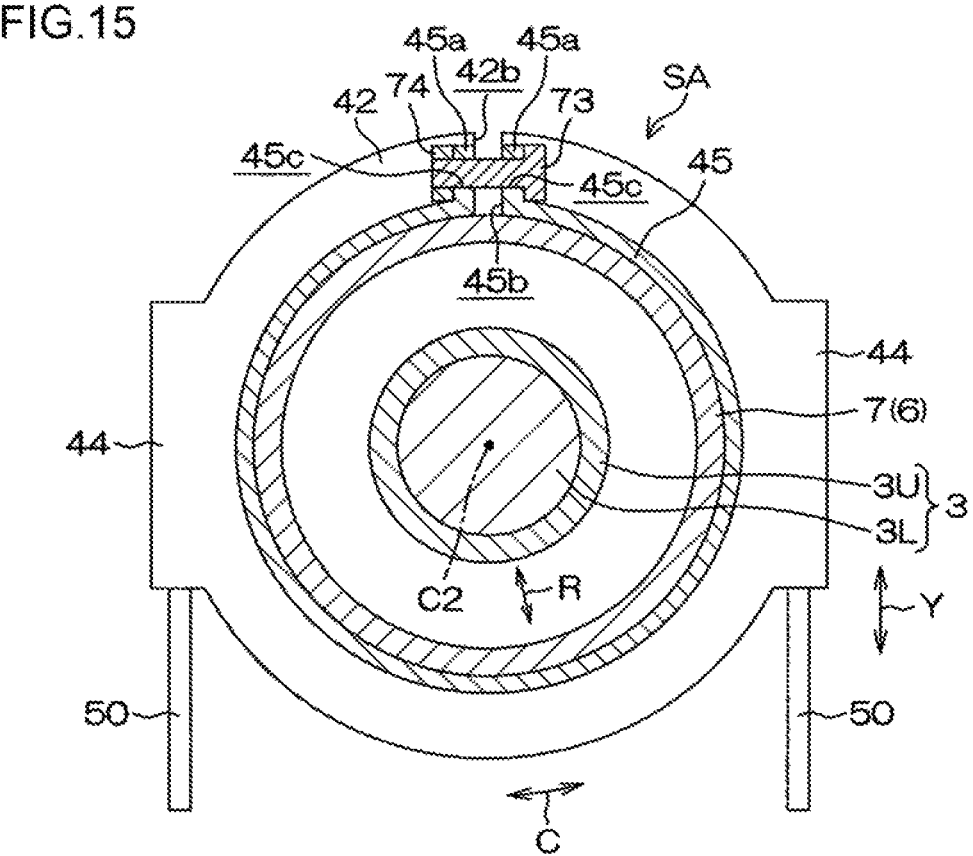
FIG. 15 is a schematic cross-sectional view of a first sliding member and surrounding components of a steering system according to a sixth modification of the first embodiment.

Next, a sixth modification of the first embodiment will be described. FIG. 15 is a schematic cross-sectional view of a first sliding member 40 and surrounding components of a steering system 1 according to the sixth modification. In FIG. 15, the same members as the members that have been described so far are given the same reference numerals to omit description. In the steering system 1 according to the sixth modification, as illustrated in FIG. 15, the first sliding member 40 does not include the plurality of projections 43, and the first sliding member 40 may include an ended annular portion 45 that has a pair of end portions 45a in the circumferential direction C, instead of the fitted portion 41. The pair of end portions 45a are in the shape of plates that face each other in the circumferential direction C of the upper jacket 7. The flange portion 42 is provided with a slit 42b that communicates with a slit 45b between the pair of end portions 45a.

The first sliding member 40 includes a bolt 73 inserted through insertion holes 45c formed in the pair of end portions 45a, and a nut 74 screwed to the bolt 73. The degree to which the diameter of the ended annular portion 45 is reduced is adjusted by adjusting the degree to which the bolt 73 is tightened to the nut 74. Consequently, the first resistive force G1 can be set to a desired value.

Figure 16A:
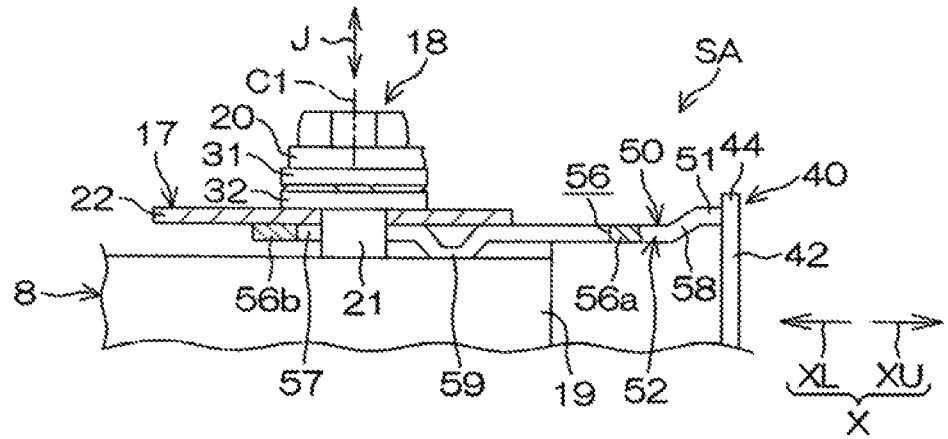
FIG. 16A is a schematic bottom view of a second sliding member and surrounding components of a steering system according to a seventh modification of the first embodiment.
Figure 16B:
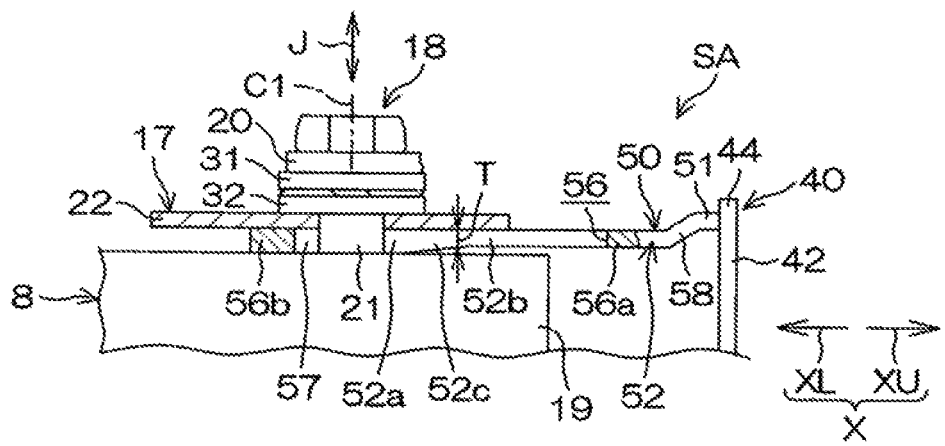
FIG. 16B is a schematic bottom view of a second sliding member and surrounding components of a steering system according to an eighth modification of the first embodiment.
Figure 16C:
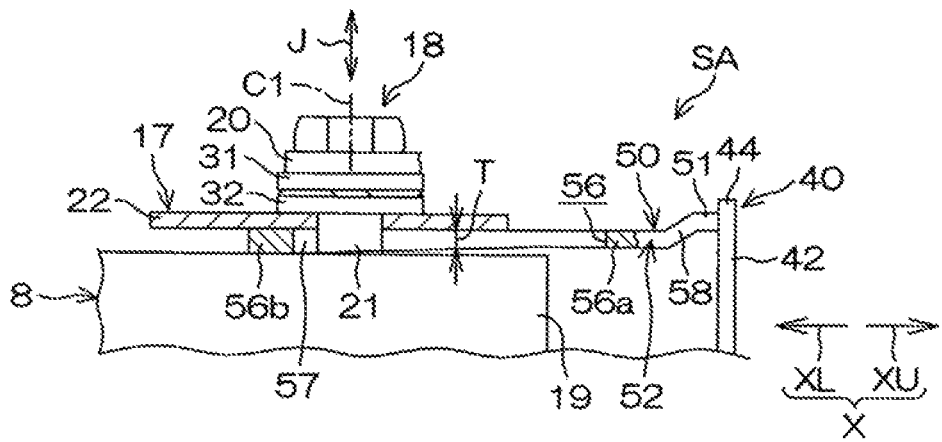
FIG. 16C is a schematic bottom view of a second sliding member and surrounding components of a steering system according to a ninth modification of the first embodiment.

Next, seventh to ninth modifications of the first embodiment will be described. FIG. 16A is a schematic bottom view of a second sliding member 50 and surrounding components of a steering system 1 according to the seventh modification. FIG. 16B is a schematic bottom view of a second sliding member 50 and surrounding components of a steering system 1 according to the eighth modification. FIG. 16C is a schematic bottom view of a second sliding member 50 and surrounding components of a steering system 1 according to the ninth modification. FIGS. 16A to 16C illustrate only one of the second sliding members 50 corresponding to the tightening member 32, of the pair of second sliding members 50, and surrounding components. In FIGS. 16A to 16C, the same members as the members that have been described so far are given the same reference numerals to omit description.

With reference to FIG. 16A, a surface of the extending portion 52 of the second sliding member 50 according to the seventh modification that faces the corresponding tightened portion 19 is provided with a projecting portion 59. The projecting portion 59 is formed by deforming the extending portion 52 by pressing or the like. A portion of the extending portion 52 provided with the projecting portion 59 is pressed by the tightening members 32 and 33 more strongly than a portion of the extending portion 52 not provided with the projecting portion 59. Therefore, the second resistive force G2 is larger when the sliding portion 57 is positioned at the portion of the extending portion 52 provided with the projecting portion 59 than when the sliding portion 57 is positioned at the portion of the extending portion 52 not provided with the projecting portion 59. Thus, at the time of a secondary collision, the second resistive force G2 is varied during the second relative sliding. In this way, the projecting portion 59 functions as a second fluctuation unit that fluctuates the second resistive force G2, which is generated by the second relative sliding, in accordance with variations in relative positions of the lower jacket 8 and the support member 17 and the second sliding member 50 in the column axial direction X. Therefore, the shock load can be set more appropriately.

With reference to FIG. 16B, in the steering system 1 according to the eighth modification, a plate thickness T (width in the tightening shaft direction J) of the extending portion 52 of the second sliding member 50 differs in accordance with the position, in the column axial direction X, within the extending portion 52. Particularly, the extending portion 52 includes a thick plate portion 52a, a thin plate portion 52b, which is provided on the first sliding member 40 side with respect to the thick plate portion 52a and the plate thickness T of which is smaller than that of the thick plate portion 52a, and a plate thickness fluctuation portion 52c, which couples the thick plate portion 52a and the thin plate portion 52b to each other and the plate thickness T of which becomes larger as the plate thickness fluctuation portion 52c extends from the thin plate portion 52b toward the thick plate portion 52a. The thick plate portion 52a, the thin plate portion 52b, and the plate thickness fluctuation portion 52c are positioned in the range of movement of the sliding portion 57 in the extending portion 52. The second resistive force G2 at the time when the sliding portion 57 is positioned at the thick plate portion 52a is larger than the second resistive force G2 at the time when the sliding portion 57 is positioned at the thin plate portion 52b. Thus, at the time of a secondary collision, the second resistive force G2 is varied during the second relative sliding. In this way, the extending portion 52 functions as a second fluctuation unit that fluctuates the second resistive force G2 in accordance with variations in relative positions of the lower jacket 8 and the support member 17 and the second sliding member 50 in the column axial direction X. Therefore, the shock load can be set further appropriately.

With reference to FIG. 16C, in the steering system 1 according to the ninth modification, as with the eighth modification, the plate thickness T of the extending portion 52 of the second sliding member 50 differs in accordance with the position, in the column axial direction X, within the extending portion 52. The extending portion 52 according to the ninth modification is configured such that the plate thickness T thereof becomes larger as the extending portion 52 extends away from the first sliding member 40 (toward the axially lower side XL) in the range of movement of the sliding portion 57. Thus, at the time of a secondary collision, the second resistive force G2 is varied during the second relative sliding. In this way, the extending portion 52 functions as a second fluctuation unit that fluctuates the second resistive force G2 in accordance with variations in relative positions of the lower jacket 8 and the support member 17 and the second sliding member 50 in the column axial direction X. Therefore, the shock load can be set further appropriately.

Figure 17A:
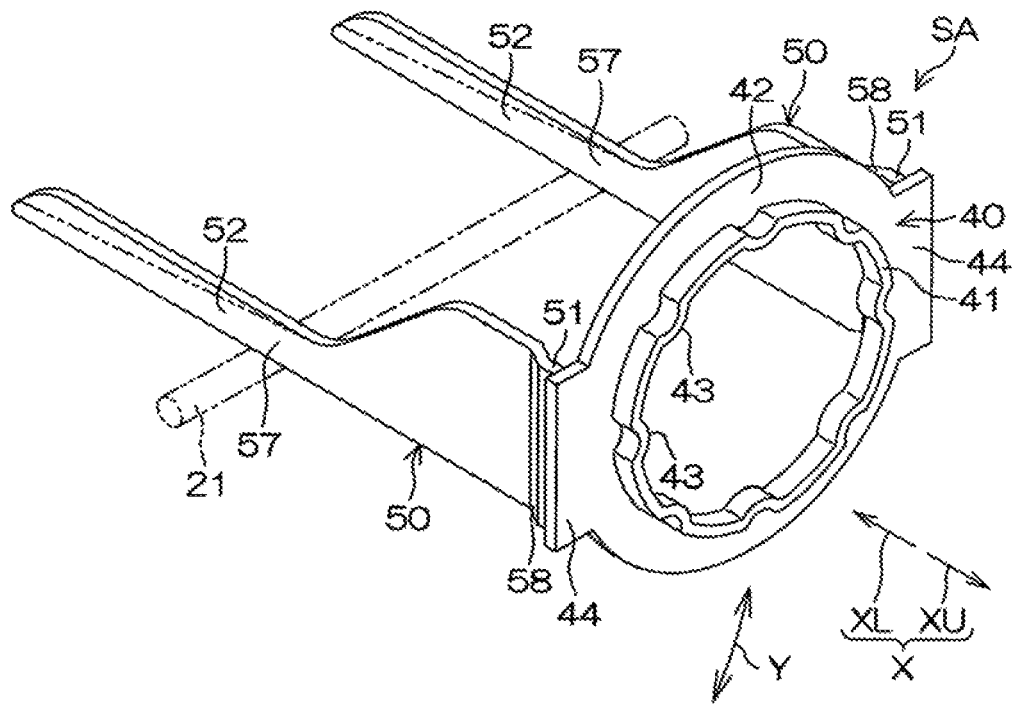
FIG. 17A is a perspective view of a shock absorption mechanism of a steering system according to a tenth modification of the first embodiment.
Figure 17B:
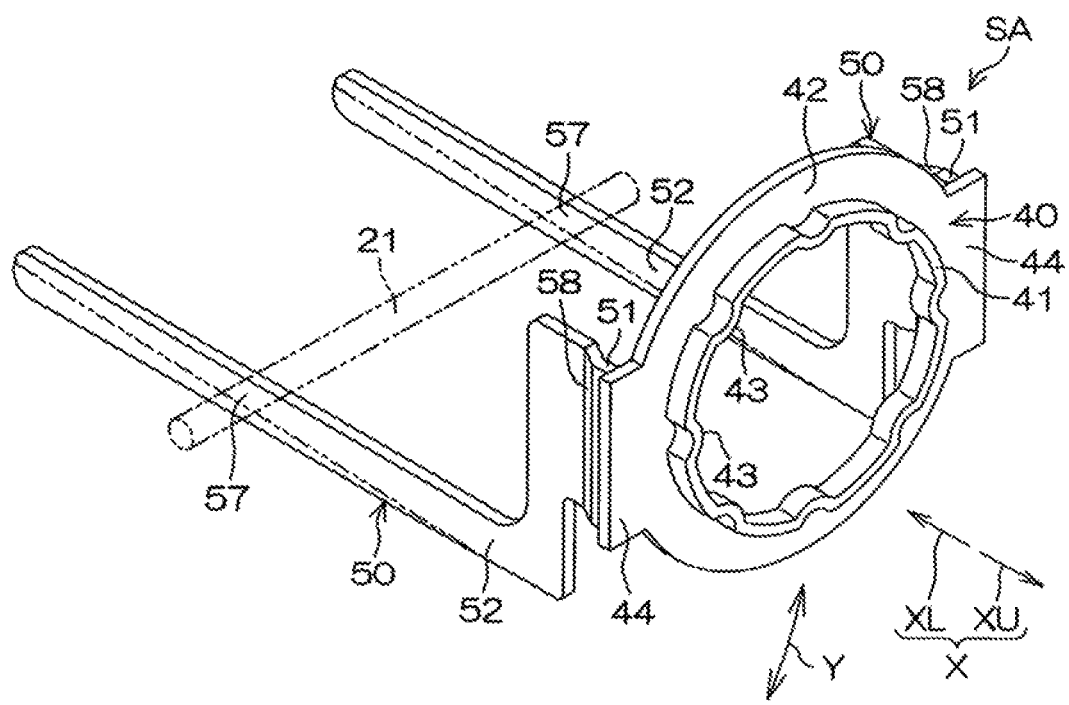
FIG. 17B is a perspective view of a shock absorption mechanism of a steering system according to an eleventh modification of the first embodiment.

Next, tenth and eleventh modifications of the first embodiment will be described. FIG. 17A is a perspective view of a shock absorption mechanism SA of a steering system 1 according to the tenth modification of the first embodiment. FIG. 17B is a perspective view of a shock absorption mechanism SA of a steering system 1 according to the eleventh modification. In FIGS. 17A and 17B, the same members as the members that have been described so far are given the same reference numerals to omit description.

As illustrated in FIG. 17A, the extending portions 52 of the second sliding members 50 according to the tenth modification are each not formed with an axial long hole 56. The extending portions 52 function as an upper facing portion that faces the tightening shaft 21 from the first side (upper side) in the tilt direction Y. As illustrated in FIG. 17B, the extending portions 52 of the second sliding members 50 according to the eleventh modification are each not formed with an axial long hole 56. The extending portions 52 function as a lower facing portion that faces the tightening shaft 21 from the second side (lower side) in the tilt direction Y.

Here, the degree to which the side plates 22 of the support member 17 and the tightened portions 19 of the lower jacket 8 hold the second sliding members 50 therebetween occasionally differs in accordance with the position in the tilt direction Y, depending on the dimensional accuracy of the side plates 22 and the tightened portions 19. In that case, the sliding load between the extending portions 52 and the corresponding side plates 22 and the tightened portions 19 and the vibration rigidity differ in accordance with the position in the tilt direction Y. Thus, the sliding load between the extending portions 52 and the side plates 22 and the tightened portions 19 may differ between a position above the tightening shaft 21 and a position below the tightening shaft 21. However, the extending portions 52 according to the tenth modification face the tightening shaft 21 only from the upper side in the tilt direction Y, and therefore fluctuations in sliding load between the second sliding members 50 and the side plates 22 and the tightened portions 19 and vibration rigidity are reduced.

The amount of material such as metal that is used to form the extending portions 52 can be reduced compared to a configuration in which the extending portions 52 are disposed on both sides of the tightening shaft 21 in the tilt direction Y. Consequently, the cost and the mass of the second sliding members 50 can be reduced. At the time of a secondary collision, a shock in the tilt direction Y is occasionally transferred to the upper jacket 7. The shock which has been transferred to the upper jacket 7 is transferred to the tightening shaft 21 via the lower jacket 8. Consequently, the tightening shaft 21 is urged to be moved in the tilt direction Y. In the configuration according to the tenth modification, the extending portions 52 face the tightening shaft 21 only from the upper side in the tilt direction Y. Thus, the extending portions 52 can be elastically deformed to escape upward even if the tightening shaft 21 or the tightening member 32 or 33 abuts against the extending portions 52. This can suppress generation of an unintentional excessive friction force between the tightening shaft 21 or the tightening member 32 or 33 and the extending portions 52 due to the transfer of the shock in the tilt direction Y to the tightening shaft 21.

The eleventh modification also achieves the same effect as that achieved by the tenth modification. Unlike the tenth modification or the eleventh modification, the extending portions 52 may be formed in a tapered shape such that the width thereof in the tilt direction Y becomes smaller as the extending portions 52 extend away from the first sliding member 40 as indicated by the long dashed double-short dashed lines in FIGS. 17A and 17B. Consequently, the area over which the extending portions 52 and the side plates 22 and the tightened portions 19 contact each other can be reduced. Consequently, fluctuations in rigidity or contact state in the column axial direction X can be reduced.

Figure 18:
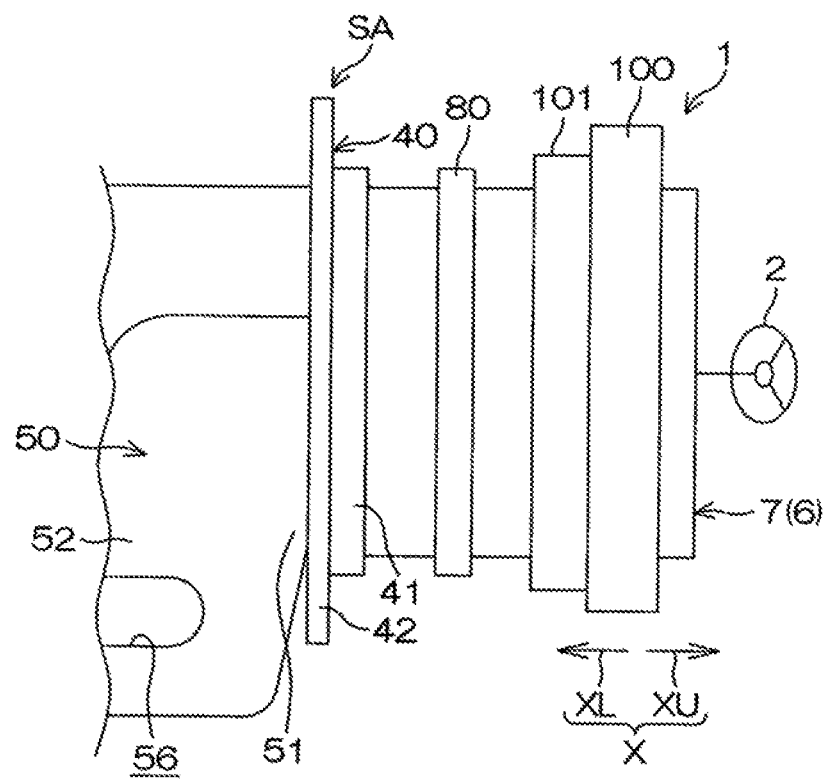
FIG. 18 is a schematic side view of an upper jacket and surrounding components of a steering system according to a twelfth modification of the first embodiment.
Figure 19:
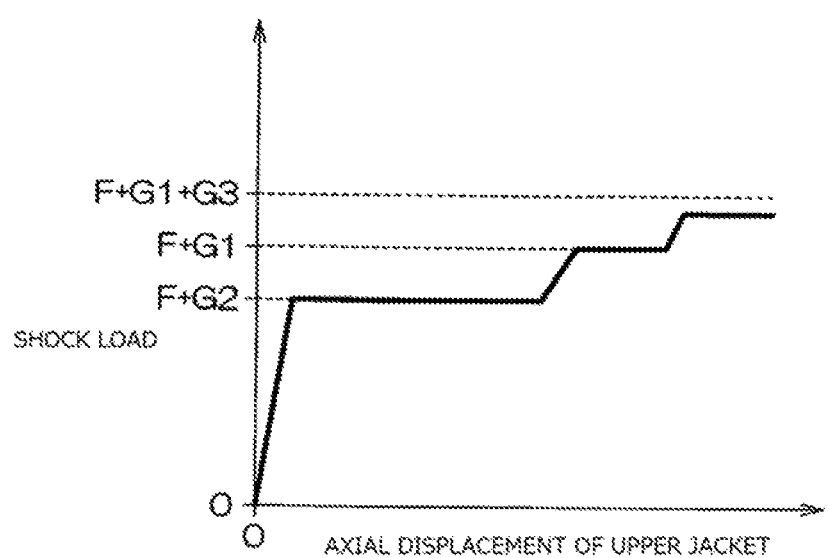
FIG. 19 is a graph illustrating the relationship between the axial displacement of the upper jacket and the shock load at the time when a secondary collision has occurred in the steering system according to the twelfth modification of the first embodiment.

Next, a twelfth modification of the first embodiment will be described. FIG. 18 is a schematic side view of an upper jacket 7 and surrounding components of a steering system 1 according to the twelfth modification. FIG. 19 is a graph illustrating the relationship between the axial displacement of the upper jacket 7 and the shock load at the time when a secondary collision has occurred in the steering system 1 according to the twelfth modification. In FIGS. 18 and 19, the same members as the members that have been described so far are given the same reference numerals to omit description.

With reference to FIG. 18, the steering system 1 according to the twelfth modification further includes a third sliding member 80 attached to the upper jacket 7 so as to be frictionally slidable with respect to the upper jacket 7. Frictional sliding between the third sliding member 80 and the upper jacket 7 is referred to as third relative sliding. A resistive force generated by the third relative sliding is referred to as a third resistive force G3. The third sliding member 80 has the same configuration as that of the fitted portion 41 of the first sliding member 40. That is, the third sliding member 80 is an annular member externally fitted with the outer peripheral surface of the upper jacket 7, and the inner peripheral surface of the third sliding member 80 is provided with a plurality of projections that contact the outer peripheral surface of the upper jacket 7. The third sliding member 80 is positioned between the first sliding member 40 and the facing member 101.

At the time of a secondary collision, the first sliding member 40 abuts against the third sliding member 80 from the axially lower side XL after the first relative sliding has been started and before the first sliding member 40 abuts against the facing member 101. Consequently, the third sliding member 80 is pressed from the axially lower side XL by the first sliding member 40 to start sliding relative to the upper jacket 7. That is, the third relative sliding is caused concurrently with the first relative sliding. Consequently, the third sliding member 80 functions as a third resistive force generation unit that generates the third resistive force G3 by performing the third relative sliding with respect to the upper jacket 7 at the time of a secondary collision. As illustrated in FIG. 19, the shock load is increased in the middle of the first relative sliding to become equal to the sum of the first resistive force G1 which is generated by the first relative sliding, the third resistive force G3, and the column resistive force F which is generated with the upper jacket 7 sliding with respect to the lower jacket 8. The first relative sliding and the third relative sliding are stopped when the facing member 101 abuts against the third sliding member 80 from the axially upper side XU.

In the twelfth modification, at the time of a secondary collision, the shock load is increased with the third relative sliding between the third sliding member 80 and the upper jacket 7 caused concurrently with the first relative sliding. Thus, the total amount of shock at the time of a secondary collision to be absorbed is further increased. In addition, the third resistive force G3 can be adjusted, and the timing when the third relative sliding is caused (the position of attachment of the third sliding member 80) can be adjusted. Thus, the shock load can be set further appropriately. Unlike the twelfth modification, a plurality of third sliding members 80 may be provided. Consequently, the shock load can be increased in multiple steps. In addition, the third resistive force G3 may be adjusted to a different value from the first resistive force G1.

Figure 20A:
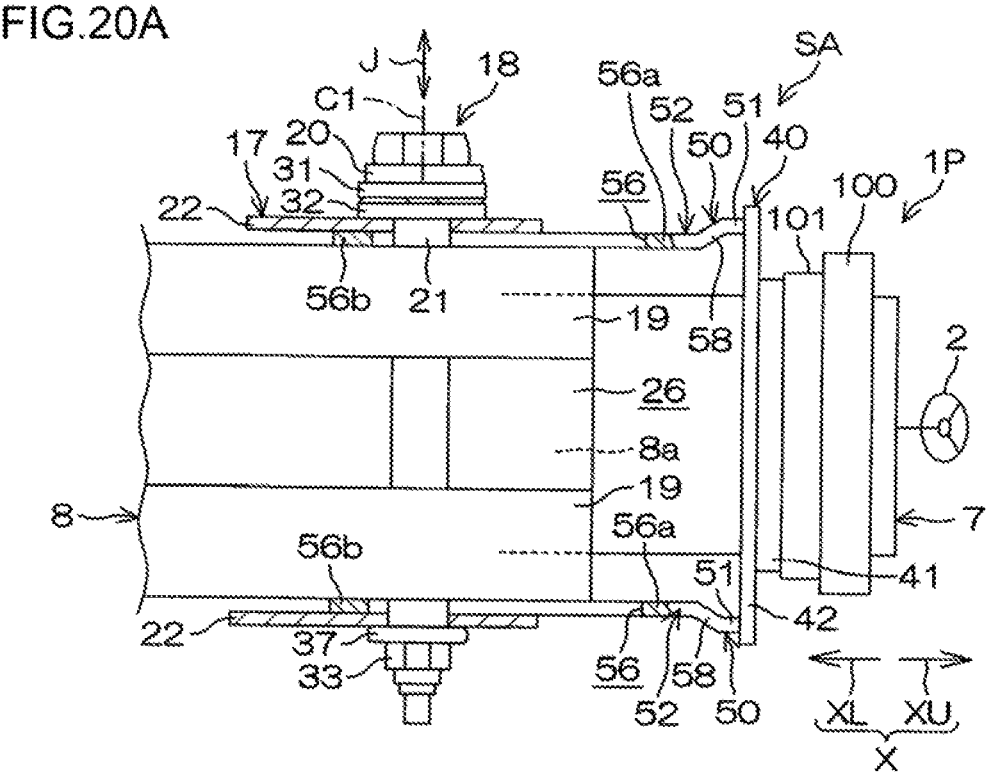
FIGS. 20A and 20B are schematic views illustrating how a shock absorption mechanism and surrounding components operate when a secondary collision has occurred in a steering system according to a second embodiment.
Figure 20B:
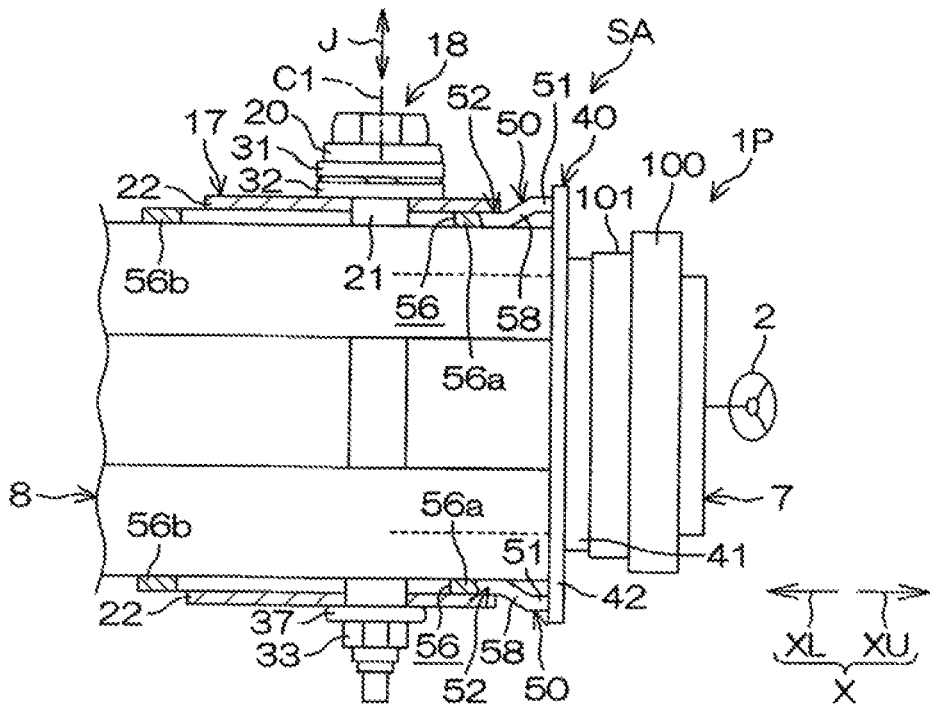
Figure 21A:
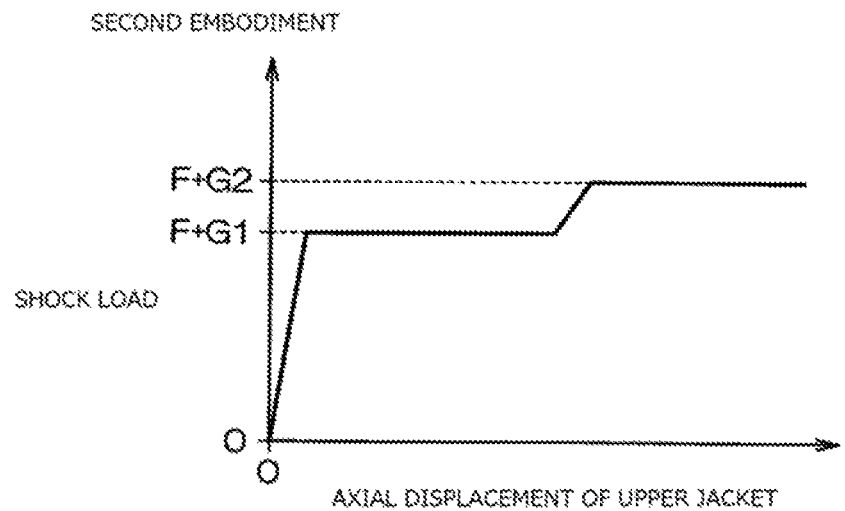
FIG. 21A is a graph illustrating the relationship between the axial displacement of an upper jacket and the shock load at the time when a secondary collision has occurred in the steering system according to the second embodiment.

A second embodiment will be described below. FIGS. 20A and 20B are schematic views illustrating how a first sliding member 40 and second sliding members 50 and surrounding components operate when a secondary collision has occurred in a steering system 1P according to a second embodiment. FIG. 20B illustrates a state after the state illustrated in FIG. 20A. FIG. 21A is a graph illustrating the relationship between the axial displacement of the upper jacket 7 and the shock load at the time when a secondary collision has occurred in the steering system 1P according to the second embodiment. In FIGS. 20A to 21B, the same members as the members that have been described so far are given the same reference numerals to omit description.

The steering system 1P according to the second embodiment has substantially the same configuration as that of the steering system 1 (see FIGS. 6A and 6B) according to the first embodiment. The steering system 1P differs from the steering system 1 mainly in that the first resistive force G1 which is generated by the first relative sliding is smaller than the second resistive force G2 which is generated by the second relative sliding (G1<G2). Therefore, the first relative sliding is started earlier than the second relative sliding. The shock load in the initial stage of a secondary collision is equal to the sum of the first resistive force G1 which is generated by the first relative sliding and the column resistive force F which is generated when the upper jacket 7 frictionally slides with respect to the lower jacket 8 (see FIG. 21A). In the middle of the first relative sliding, the lower end, in the axial direction, of the guide groove 27 and the guided protrusion 28 abut against each other to break the guided protrusion 28.

Then, as illustrated in FIG. 20A, the facing member 101 and the first sliding member 40 abut against each other.

Consequently, movement of the first sliding member 40 and the second sliding members 50 toward the axially lower side XL with respect to the upper jacket 7 is regulated. Consequently, movement of the first sliding member 40 with respect to the upper jacket 7 is terminated. That is, the first relative sliding is stopped. The facing member 101 functions as a first stopper that stops the first relative sliding. On the other hand, the upper jacket 7 is continuously moved toward the axially lower side XL with respect to the lower jacket 8. Therefore, the second relative sliding between the second sliding members 50 and the lower jacket 8 and the support member 17 is started.

The shock load after the second relative sliding has been started corresponds to the sum of the second resistive force G2 which is generated by the second relative sliding and the column resistive force F which is generated when the upper jacket 7 frictionally slides with respect to the lower jacket 8 (see FIG. 21A). The second relative sliding is stopped with the axially upper end 8a of the lower jacket 8 and the first sliding member 40 abutting against each other (see FIG. 20B). In this way, the first relative sliding is caused in the initial stage of a secondary collision, and the second relative sliding is caused in the final stage of the secondary collision.

In the second embodiment, the first resistive force G1 which is generated by the first relative sliding is smaller than the second resistive force G2 which is generated by the second relative sliding, and therefore the first relative sliding is caused at the same time as movement of the upper jacket 7 with respect to the lower jacket 8 is started. Thus, the shock at the time of a secondary collision starts being absorbed sufficiently by the column resistive force F and the first resistive force G1 immediately after the occurrence of the secondary collision. Hence, an increased total amount of shock at the time of a secondary collision can be absorbed. Then, when the first relative sliding is stopped, the second relative sliding is started in order to absorb the shock at the time of a secondary collision.

The shock load during a secondary collision can be controlled easily in accordance with the axial displacement of the upper jacket 7 with respect to the lower jacket 8 by adjusting the resistive forces G1 and G2, which are required for the first relative sliding and the second relative sliding, to respective desired values. For example, the shock load can be varied stepwise in accordance with the axial displacement of the upper jacket 7 with respect to the lower jacket 8 just by adjusting the first resistive force G1 and the second resistive force G2 to constant values that are different from each other. There is no need to perform processing so as to increase the diameter of the upper jacket 7 stepwise.

As a result, an increased amount of shock at the time of a secondary collision can be absorbed, and the shock load can be set appropriately. In the second embodiment, the first resistive force G1 which is generated by the first relative sliding is smaller than the second resistive force G2 which is generated by the second relative sliding. Therefore, the first relative sliding is started immediately after the occurrence of a secondary collision. Then, the first relative sliding is stopped by the facing member 101 (first stopper). Particularly, the facing member 101 (first stopper) abuts against the first sliding member 40 from the axially upper side XU when the column jacket 6 is contracted. Consequently, movement of the first sliding member 40 and the second sliding members 50 relative to the upper jacket 7 is terminated, and thus the first relative sliding is stopped. Also after that, the upper jacket 7 is further moved with respect to the lower jacket 8 and the support member 17, and thus the first sliding member 40 and the second sliding members 50 are moved with respect to the lower jacket 8 and the support member 17 together with the upper jacket 7. Consequently, the second relative sliding is started at the same time as the first relative sliding is stopped.

Figure 21B:
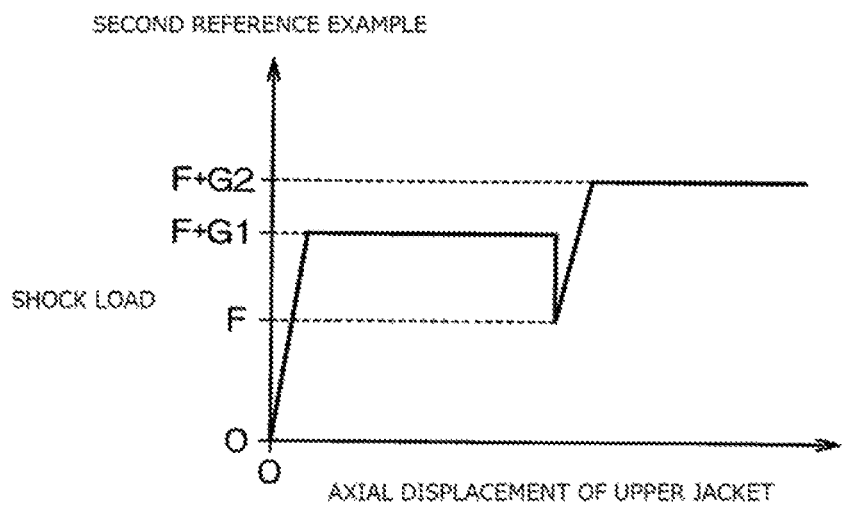
FIG. 21B is a graph illustrating the relationship between the axial displacement of an upper jacket and the shock load at the time when a secondary collision has occurred in a steering system according to a second reference example.

On the other hand, in a steering system configured in accordance with a second reference example in which the first resistive force G1 is smaller than the second resistive force G2 and the second sliding members 50 are not moved together with the first sliding member 40 in the column axial direction X, unlike the present embodiment, the second relative sliding is not necessarily started when the first relative sliding is stopped. Therefore, as indicated in FIG. 21B, the shock load is occasionally lowered abruptly from the sum of the first resistive force G1 and the column resistive force F to the column resistive force F after the stop of the first relative sliding and before the start of the second relative sliding. Thus, with the steering system configured in accordance with the second reference example, the shock at the time of a secondary collision may not be absorbed smoothly. In the second embodiment, on the other hand, the second relative sliding is started instantly when the first relative sliding is stopped. Therefore, a reduction in resistive force (shock load) due to the stop of the first relative sliding can be suppressed as indicated in FIG. 21A. Thus, the shock at the time of a secondary collision can be absorbed smoothly.

Here, the load with which the second sliding members 50 are held between the corresponding tightened portions 19 of the lower jacket 8 and the corresponding side plates 22 of the support member 17 is interlocked with the load with which the tightening mechanism 18 tightens the lower jacket 8 to the upper jacket 7. Thus, the magnitude of the second resistive force G2 is interlocked with the tightening load of the tightening mechanism 18. On the other hand, the first resistive force G1 which is generated by the first relative sliding between the first sliding member 40 and the upper jacket 7 is not interlocked with the tightening load of the tightening mechanism 18. Therefore, the first resistive force G1 which is generated by the first relative sliding can be adjusted easily compared to the second resistive force G2 which is generated by the second relative sliding. Thus, the shock load in the initial stage of a secondary collision can be adjusted easily in a configuration in which the first resistive force G1 which is generated by the first relative sliding is smaller than the second resistive force G2 which is generated by the second relative sliding.

Besides, the second embodiment achieves the same effect as that achieved by the first embodiment. Further, the configuration of each of the modifications (first to twelfth modifications) of the first embodiment can also be applied to the second embodiment.

The present invention is not limited to the embodiments described above, and may be modified in various ways within the scope of the claims. For example, unlike the embodiments discussed above, the first resistive force G1 which is generated by the first relative sliding and the second resistive force G2 which is generated by the second relative sliding may be equal to each other (G1=G2). In this case, the first relative sliding and the second relative sliding may be started at the same time, and the first relative sliding and the second relative sliding may be performed alternately. In this case, the difference between the shock load in the initial stage of a secondary collision and the shock load in the final stage of the secondary collision can be suppressed.

The steering system 1 is not required to include the pair of second sliding members 50. That is, the steering system 1 may be provided with only one second sliding member 50 of the pair of second sliding members 50. Alternatively, a plurality of second sliding members 50 corresponding to each of the side plates 22 may be provided. Particularly, a plurality of second sliding members 50 may be disposed between the first side plate 22 (the side plate 22 on the upper side in FIGS. 6A and 6B) and the first tightening member 32, and a plurality of second sliding members 50 may be disposed between the second side plate 22 (the side plate 22 on the lower side in FIGS. 6A and 6B) and the second tightening member 33. A sliding plate may be interposed between the plurality of second sliding members 50 corresponding to each of the side plates 22, the sliding plate being coupled to the side plate 22.

In the embodiments discussed above, the first sliding member 40 and the second sliding members 50 which have been formed separately are fixed to each other by welding or the like. Unlike the embodiments discussed above, however, the first sliding member 40 and the second sliding members 50 may be formed integrally with each other by pressing, forging, or the like. In the embodiments discussed above, the first sliding member 40 and the second sliding members 50 are made of metal. Unlike the embodiments discussed above, however, the first sliding member 40 and the second sliding members 50 may be made of a resin or the like. In the embodiments discussed above, the first sliding member 40 and the pair of second sliding members 50 are fixed to each other. However, the first sliding member 40 and the pair of second sliding members 50 are not required to be fixed to each other. For example, the first sliding member 40 and the pair of second sliding members 50 may be concave-convex engaged so as to be movable together with each other.

In the embodiments discussed above, the second sliding members 50 are disposed between the corresponding tightened portions 19 of the lower jacket 8 and the corresponding side plates 22 of the support member 17. Unlike the embodiments discussed above, however, the second sliding members 50 may be disposed between the corresponding side plates 22 of the support member 17 and the corresponding tightening members 32 and 33. The second sliding member 50 which is disposed between the second tightening member 33 and the second side plate 22 is disposed between the needle roller bearing 37 and the second side plate 22, to be exact.

Unlike the embodiments discussed above, an increased diameter portion 7a (see the long dashed double-short dashed lines in FIG. 5) may be provided on a portion of the upper jacket 7 on the axially upper side XU with respect to a portion to which the first sliding member 40 has been attached. The diameter of the outer peripheral surface of the increased diameter portion 7a is larger than the diameter of the outer peripheral surface of the portion to which the first sliding member 40 has been attached. Therefore, when the first sliding member 40 reaches the increased diameter portion 7a with the first sliding member 40 and the upper jacket 7 sliding relative to each other in the column axial direction X in the first relative sliding, the first resistive force G1 which is generated by the first relative sliding becomes larger. When the first resistive force G1 which is generated by the first relative sliding becomes larger than the second resistive force G2 which is generated by the second relative sliding, the first relative sliding is stopped. In this way, the increased diameter portion 7a may be configured to function as a first stopper.

Unlike the embodiments discussed above, the upper jacket 7 may be configured such that the diameter thereof is increased toward the axially upper side XU in the sliding region of the first sliding member 40. In this case, the first resistive force G1 which is generated by the first relative sliding is fluctuated in accordance with variations in relative positions of the upper jacket 7 and the first sliding member 40. In this case, the facing member 101 may not be provided.

In the embodiments discussed above, the facing member 101 is a bracket for attaching the attachment part 100 or the like. Unlike the embodiments discussed above, however, the facing member 101 may be constituted by a part of the upper jacket 7. Particularly, the facing member 101 may be constituted by a cut and raised portion formed by making a U-shaped cut in the upper jacket 7 and raising the inner portion of the U-shaped cut.

What is claimed is:

1. A steering system comprising:
    an upper jacket connected to a steering member by an upper shaft at a first end in a column axial direction;
    a lower jacket externally fitted with a second end of the upper jacket in the column axial direction such that the lower jacket is slidable with respect to the upper jacket;
    a support member fixed to a vehicle body and configured to support the lower jacket;
    a first resistive force generation member configured to generate a first resistive force by performing a first relative sliding operation with respect to the upper jacket when the upper jacket is moved with respect to the lower jacket during a secondary collision, the first relative sliding operation including a frictional sliding of the first resistive force generation member with respect to the upper jacket; and
    a second resistive force generation member configured to move together with the first resistive force generation member in the column axial direction, the second resistive force generation member being configured to generate a second resistive force by performing a second relative sliding operation with respect to at least one of the support member and the lower jacket when the upper jacket is moved with respect to the lower jacket during the secondary collision, the second relative sliding operation including a frictional sliding of the second resistive force generation member with respect to the at least one of the support member and the lower jacket.

2. The steering system according to claim 1, further comprising:
    a first stopper configured to stop the first relative sliding operation, wherein the first resistive force is less than the second resistive force.

3. The steering system according to claim 1, further comprising:
    a second stopper configured to stop the second relative sliding operation, wherein the first resistive force is greater than the second resistive force.

4. The steering system according to claim 3, further comprising:
    a facing member fixed to the upper jacket and configured to: (i) face the first resistive force generation member from a side of the steering member in the column axial direction, and (ii) abut against the first resistive force generation member when the first relative sliding operation is stopped.

5. The steering system according to claim 1, wherein the first resistive force is equal in magnitude to the second resistive force.

6. The steering system according to claim 1, further comprising:
    a tightening member facing the lower jacket and tightening the lower jacket, the second resistive force generation member being disposed between the tightening member and the lower jacket.

7. The steering system according to claim 1, wherein:
    the second resistive force generation member extends parallel to the column axial direction; and
    the second resistive force generation member includes: (i) a large width portion coupled to the first resistive force generation member, (ii) a small width portion having a width in an up-down direction is-smaller than a width of the large width portion, and (iii) a coupling portion coupling the large width portion with the small width portion, a width of the coupling portion in the up-down direction being gradually smaller from a side of the large width portion toward a side of the small width portion.

8. The steering system according to claim 1, further comprising:
    an insertion shaft inserted through the support member and the lower jacket, the second resistive force generation member facing the insertion shaft from either an upper side of the insertion shaft or a lower side of the insertion shaft.

9. The steering system according to claim 1, further comprising:
    a first fluctuation member configured to fluctuate the first resistive force based on variations in a relative position of the upper jacket to the first resistive force generation member.

10. The steering system according to claim 1, further comprising:
    a second fluctuation member configured to fluctuate the second resistive force based on variations in a relative position of at least one of the support member and the lower jacket to the second resistive force generation member.

11. The steering system according to according to claim 1, further comprising:
    a third resistive force generation member configured to generate a third resistive force by performing a third relative sliding operation with respect to the upper jacket when the upper jacket is moved with respect to the lower jacket during the secondary collision, the third relative sliding operation being performed concurrently with the first relative sliding operation during the secondary collision.

* * * * *